(12) United States Patent
Bernier et al.

(10) Patent No.: US 12,253,718 B2
(45) Date of Patent: Mar. 18, 2025

(54) MID-INFRARED OPTICAL FIBERS WITH ENHANCED OH-DIFFUSION RESISTANCE

(71) Applicant: Université Laval, Quebec (CA)

(72) Inventors: Martin Bernier, Québec (CA); Réal Vallée, Québec (CA); Souleymane Toubou Bah, Québec (CA); Vincent Fortin, Québec (CA); Frédéric Maes, Québec (CA); Yigit Ozan Aydin, Québec (CA)

(73) Assignee: Université Laval, Quebec (CA)

( * ) Notice: Subject to any disclaimer, the term of this patent is extended or adjusted under 35 U.S.C. 154(b) by 0 days.

(21) Appl. No.: 18/502,350

(22) Filed: Nov. 6, 2023

(65) Prior Publication Data

US 2024/0069284 A1 Feb. 29, 2024

Related U.S. Application Data

(62) Division of application No. 16/919,874, filed on Jul. 2, 2020, now Pat. No. 11,846,807.

(Continued)

(51) Int. Cl.
*G02B 6/26* (2006.01)
*H01S 3/067* (2006.01)

(52) U.S. Cl.
CPC .......... *G02B 6/262* (2013.01); *H01S 3/06716* (2013.01)

(58) Field of Classification Search
CPC ...... G02B 6/262; G02B 6/241; G02B 6/4494; H01S 3/06716; H01S 3/0675; H01S 3/1608; H01S 3/173; C03B 37/023; C03C 3/004

See application file for complete search history.

(56) References Cited

U.S. PATENT DOCUMENTS

| 4,735,856 A | 4/1988 | Schultz et al. |
| 4,780,372 A | 10/1988 | Tracy et al. |

(Continued)

FOREIGN PATENT DOCUMENTS

| JP | S5862601 | 4/1983 |
| WO | WO 2011/009198 | 1/2011 |

OTHER PUBLICATIONS

Aydin et al., "Diode-pumped mid-infrared fiber laser with 50% slope efficiency", *Optica*, vol. 4, No. 2, Feb. 13, 2017, Optical Society of America, pp. 235-238.

(Continued)

*Primary Examiner* — Michael P Mooney
(74) *Attorney, Agent, or Firm* — Levine Bagade Han LLP

(57) ABSTRACT

Mid-infrared-transparent optical fiber products with enhanced resistance to OH diffusion are disclosed, which may be used fiber laser oscillator and amplifiers systems. In one embodiment, an optical fiber product may include optical fiber configured for propagation of mid-infrared radiation toward a light-radiating endface of or coupled to the optical fiber, and a diffusion barrier disposed on the light-radiating endface and configured for allowing the mid-infrared radiation emanating from the light-radiating endface to pass therethrough and for preventing OH diffusion therethrough toward the light-radiating endface. In another embodiment, an optical fiber product may include an optical fiber for propagation of mid-infrared radiation and an endcap coupled to the optical fiber for receiving therefrom the mid-infrared radiation and radiating out the mid-infrared radiation, the endcap being made of an endcap material that has no or a low amount of fluoride and that is less permeable to OH diffusion than the fiber-optic material.

54 Claims, 15 Drawing Sheets

Related U.S. Application Data

(60) Provisional application No. 62/947,192, filed on Dec. 12, 2019.

(56) References Cited

U.S. PATENT DOCUMENTS

| | | | |
|---|---|---|---|
| 4,874,222 | A | 10/1989 | Vacha et al. |
| 4,938,562 | A | 7/1990 | Vacha et al. |
| 5,968,637 | A | 10/1999 | Baret |
| 6,673,438 | B1 | 1/2004 | Bond et al. |
| 6,705,771 | B2 | 3/2004 | Jiang et al. |
| 10,084,287 | B2 | 9/2018 | Bernier et al. |
| 11,846,807 | B2 | 12/2023 | Bernier et al. |
| 2003/0186064 | A1 | 10/2003 | Murata |
| 2004/0208470 | A1* | 10/2004 | Janney ............... G02B 6/02 385/144 |
| 2008/0013959 | A1* | 1/2008 | Ishigami ............ G02B 6/4204 398/135 |
| 2010/0080500 | A1* | 4/2010 | Zheng ................. G01B 11/14 385/12 |
| 2018/0080866 | A1* | 3/2018 | Tokura ............... G01N 21/3504 |
| 2018/0109078 | A1* | 4/2018 | Bernier ............... H01S 3/0092 |
| 2021/0181417 | A1 | 6/2021 | Bernier et al. |

OTHER PUBLICATIONS

Aydin et al., Endcapping of high-power 3 μm fiber lasers, *Optics Express*, vol. 27, No. 15, Jul. 22, 2019, Optical Society of America, pp. 20659-20669.

Aydin et al., "High-energy picosecond pulses from a 2850 nm fiber amplifier", *Optics Letters*, vol. 43, No. 12, Jun. 15, 2018, Optical Society of America, pp. 2748-2751.

Aydin et al., "Towards power scaling of 2.8 μm fiber lasers", *Optics Letters*, vol. 43, No. 18, Sep. 15, 2018, Optical Society of America, pp. 4542-4545.

Bah et al., "Fabrication of TaOxNy thin films by reactive ion beam-assisted ac double magnetron sputtering for optical applications", *Thin Solid Films 615*, Jul. 25, 2016, Elsevier, pp. 351-357.

Beheim, "Fiber-Optic Temperature Sensor Using a Thin-Film Fabry-Perot Interferometer", Thesis, Department of Electrical Engineering and Applied Physics, Case Western Reserve University, May 1997, 388 pages.

Bernier et al., "Bragg gratings photoinduced in ZBLAN fibers by femtosecond pulses at 800 nm", *Optics Letters*, vol. 32, No. 5, Mar. 1, 2007, Optical Society of America, pp. 454-456.

Berube et al., "Femtosecond laser inscription of depressed cladding single-mode mid-infrared waveguides in sapphire", Centre d'Optique Photonique et Laser (COPL), Université Laval, Canada, 2019, 5 pages.

Caron et al., "Understanding the fiber tip thermal runaway present in 3 μm fluoride glass fiber lasers", *Optics Express*, vol. 20., No. 20, Sep. 24, 2012, Optical Society of America, pp. 22188-22194.

Carter et al., "Damage Mechanisms in Components for Fibre Lasers and Amplifiers", Laser-Induced Damage in Optical Materials, Sep. 20-22, 2004, *Proc. of SPIE*, vol. 5647, USA, pp. 561-571.

Duval et al., "Femtosecond fiber lasers reach the mid-infrared", *Optica*, vol. 2, No. 7, Jul. 15, 2015, Optical Society of America pp. 623-626.

Duval et al., "Watt-level fiber-based femtosecond laser source tunable from 2.8 to 3.6 μm", *Optics Letters*, vol. 41, No. 22, Nov. 15, 2016, Optical Society of America, pp. 5294-5297.

Faucher et al., 'Erbium-doped all-fiber laser at 2.94 μm', *Optics Letters*, vol. 34, Issue 21, pp. 3313-3315, Nov. 1, 2009.

Fortin et al., "10-W-level monolithic dysprosium-doped fiber laser at 3.24 μm", *Optics Letters*, vol. 44, No. 3, Feb. 1, 2019, Optical Society of America, pp. 491-494.

Frischat et al., "Chemical stability of ZrF4- and AlF3-based heavy metal fluoride glasses in water", *Journal of Non-Crystalline Solids 284*, May 2001, Elsevier, pp. 105-109.

Gauthier et al., "In-amplifier mid-infrared supercontinuum generation", *Optics Letters*, vol. 40, No. 22, Nov. 15, 2015, Optical Society of America, pp. 5247-5250.

Habel et al., "Femtosecond FBG Written through the Coating for Sensing Applications", *Sensors*, Nov. 2, 2017, 17, 2519, MDPI, 11 pages.

Heraeus, "Specialty Fiber Preforms for the Most Demanding Applications", Apr. 2020, 2 pages.

Jackson, "Towards high-power mid-infrared emission from a fibre laser", *Nature Photonics*, vol. 6, Jul. 2012, pp. 423-431.

Jiang et al., "Fluorogermanate glass with reduced content of OH-groups for infrared fiber optics," *J. Non. Cryst. Solids*, vol. 355, No. 37-42, pp. 2015-2019, Oct. 2009.

Kaloyeros et al., "Review-Silicon Nitride and Silicon Nitride-Rich Thin Film technologies: Trends in Deposition Techniques and Related Applications", *ECS Journal of Solid State Science and Technology*, 6 (10) p. 691-p. 714, Sep. 2017, pp. 691-714.

Li et al., "Thermal sensitivity of tellurite and germanate optical fibers", *Optics Express*, vol. 15, No. 14, Jul. 9, 2007, Optical Society of America, pp. 8857-8863.

Maes et al., "5.6 W monolithic fiber laser at 3.55 μm", *Optics Letters*, vol. 42, No. 11, Jun. 1, 2017, Optical Society of America, pp. 2054-2057.

Maes et al., "Room-temperature fiber laser at 3.92 μm", *Optica*, vol. 5, No. 7, Jul. 2018, Optical Society of America, pp. 761-764.

Shasta Crystals Product Catalog, 2018, San Francisco USA, 16 pages.

Shcherbakov et al., "Industrial grade 100Kw power CW fiber laser" *Advanced Solid-State Lasers Congress Technical Digest*, Optical Society of America, 2013, 3 pages.

Shelby et al., "Formation and properties of lead fluorogermanate glasses," *J. Non. Cryst. Solids*, vol. 142, pp. 269-277, Jan. 1992.

Shi et al., "Fiber lasers and their applications (Invited)", *Applied Optics*, vol. 53, No. 28, Oct. 1, 2014, Optical Society of America, pp. 6554-6568.

Thapa et al., "Fusion splicing of highly dissimilar YAG crystal fiber and silica fiber with reaction bonding" *Optical Material Express*, vol. 6, No. 8, Aug. 1, 2016, Optical Society of America, pp. 2560-2566.

Tréogat et al, "Surface—OH Profile from Reaction of a Heavy-Metal Fluoride Glass with Atmospheric Water" *Communications of the American Ceramic Society*, vol. 68, No. 7, Jul. 1985, pp. C-171 to C-173.

Uehara et al., "Power scalable 30-W mid-infrared fluoride fiber amplifier" *Optics Letters*, vol. 44, No. 19, Oct. 1, 2019, pp. 4777 to 4780.

Ueno et al., "The structures of highly transparent, water impermeable SiNx films prepared using surface-wave-plasma chemical vapor deposition for organic light-emitting displays" *Thin Solid Films*, vol. 580 pp. 106-110, Apr. 1, 2015.

Zhu et al., "High Power ZBLAN Glass Fiber Lasers: Review and Prospect", *Advances in OptoElectronics*, pp. 23 pages, Mar. 2010.

\* cited by examiner

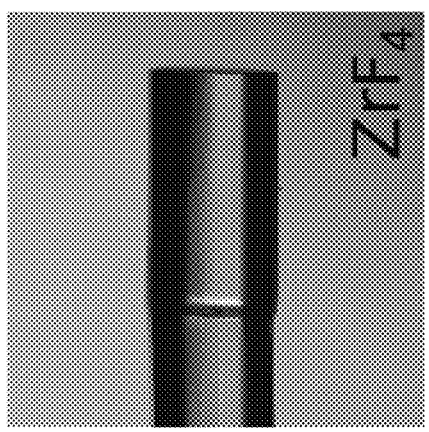
FIG. 12(a) ZrF$_4$
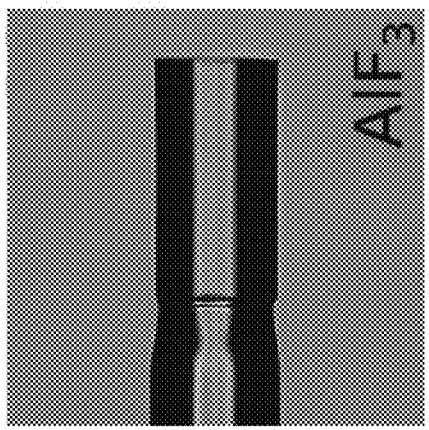
FIG. 12(b) AlF$_3$
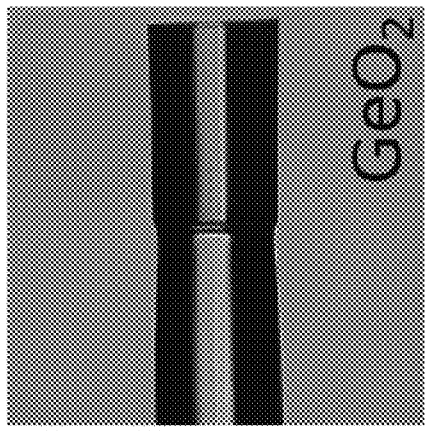
FIG. 12(c) GeO$_2$
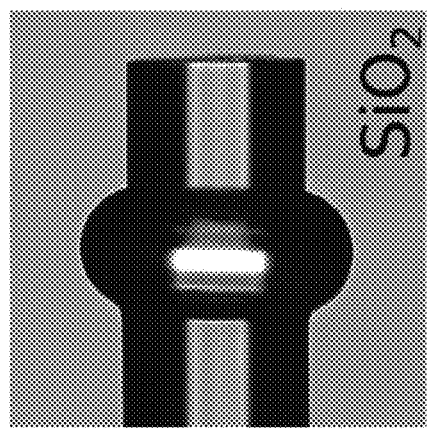
FIG. 12(d) SiO$_2$
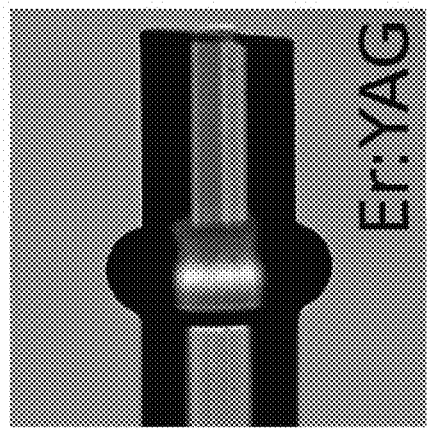
FIG. 12(e) Er:YAG
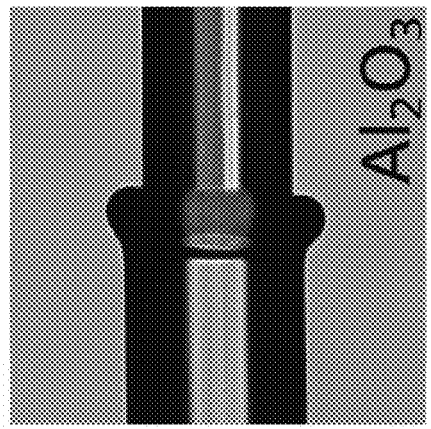
FIG. 12(f) Al$_2$O$_3$

MID-INFRARED OPTICAL FIBERS WITH ENHANCED OH-DIFFUSION RESISTANCE

CROSS-REFERENCE TO RELATED APPLICATIONS

The present application is a divisional of U.S. patent application Ser. No. 16/919,874 filed on Jul. 2, 2020, which claims priority to U.S. Provisional Patent Application No. 62/947,192 filed on Dec. 12, 2019, the disclosures of which are incorporated herein by reference in their entireties.

TECHNICAL FIELD

The technical field generally relates to mid-infrared optical fibers, and more particularly to mid-infrared optical fibers with enhanced resistance to OH diffusion.

BACKGROUND

Fiber laser technologies are playing an instrumental role in the development of various applications [1]. However, as the output power of fiber laser systems increases, the likelihood of endface damage increases accordingly. In the case of conventional $Yb^{3+}$:silica fiber lasers operating at 1 μm, such failure is generally related to the fact that their output intensity exceeds the air-glass surface damage threshold, and damage occurs either due to overheating in continuous-wave (CW) regime or laser-induced breakdown due to intense pulses [2]. To mitigate this issue, fiber-based endcaps, spliced at the output of fiber laser systems, have been developed to allow the beam to expand in a controlled manner and therefore lower its intensity below the glass damage threshold. Such endcaps have enabled the demonstration of fiber laser systems delivering over 100 kW of output power in CW operation [3].

Fluoride-based fiber lasers provide the means to achieve powerful laser emission between 2.8 and 4 μm [4-7], although their current output power is noticeably less than that of their silica-based counterparts. Yet, an erbium-doped zirconium fluoride fiber laser delivering 42 W of CW output power at 2.83 μm was recently reported, which highlighted the potential of 3-μm fiber lasers for further power-scaling up to 100-W levels [4]. Such all-fiber laser sources are coveted in the development of biological tissue ablation and remote-sensing applications, given their excellent overlap with the strong vibrational absorption band of OH bonds, their high beam quality, and their compact yet rugged design [8].

However, the widespread deployment of high-power 3-μm-class all-fiber lasers has been hindered by the short lifetime of such laser sources due to fiber tip degradation through moisture diffusion. This phenomenon is specific to these lasers, due to the overlap between their emission spectrum and the strong OH absorption band around 3 μm and the hygroscopic nature of fluoride-based glasses. Specifically, when the tip of a fluoride glass fiber is exposed to ambient air, water vapor can react with the glass constituents, which tend to increase the concentration of OH compounds at the fiber tip. These OH compounds may be absorbed by the glass structure, where they can diffuse according to Fick's laws of diffusion. Due to the strong absorption of laser radiation at around 3 μm by OH compounds, laser absorption increases as the number of OH compounds increase, which causes local heating at the fiber tip and, in turn, leads to a concomitant enhancement of the diffusion process, and so forth. This positive feedback loop may ultimately lead to the catastrophic destruction of the fiber tip. Through analytical modeling, it was demonstrated that the time elapsed before catastrophic failure of a fluoride fiber tip was inversely proportional to the square of the 3-μm output power [9]. As a result, at a 20-W power level, the all-fiber cavity reported in [4] lasted less than 10 hours before the fluoride-based endcap of the fiber laser underwent catastrophic failure due to OH diffusion.

Thus, there remains a need for mid-infrared optical fibers with enhanced resistance to OH diffusion.

SUMMARY

The present description generally relates to mid-infrared-transparent optical fibers having an enhanced resistance to OH diffusion, as can be caused by the in-diffusion of water vapor from the ambient environment. The optical fibers disclosed herein may be used, for example, in mid-infrared fiber lasers operating around 3 μm to mitigate or suppress OH-diffusion-induced fiber tip degradation.

In accordance with an aspect, there is provided an optical fiber product. The optical fiber product includes: an optical fiber made of a fiber-optic material and configured for propagation of mid-infrared radiation toward a light-radiating endface of or coupled to the optical fiber; and a diffusion barrier disposed on the light-radiating endface and configured for allowing the mid-infrared radiation emanating from the light-radiating endface to pass therethrough and for preventing OH diffusion therethrough toward the light-radiating endface.

In one embodiment, the fiber-optic material includes a glass material. For example, the glass material may include a fluoride-based glass, a chalcogenide-based glass, a chalcohalide-based glass, an oxide-based glass, a tellurite-based glass, or any combination thereof. In another embodiment, the fiber-optic material includes a crystal material.

In one embodiment, the light-radiating endface is an endface of the optical fiber. In another embodiment, the light-radiating endface is an endface of an endcap coupled between the optical fiber and the diffusion barrier. In one embodiment, the endcap is made of an endcap material that is less permeable to OH diffusion than the fiber-optic material.

In one embodiment, the light-radiating endface is perpendicular to a longitudinal fiber axis of the optical fiber product. In another embodiment, the light-radiating endface is oblique to a longitudinal fiber axis of the optical fiber product.

In one embodiment, the diffusion barrier includes a thin-film coating. Depending on the application, the thin-film coating may include a single thin-film layer or a multiple thin-film layers.

In one embodiment, the diffusion barrier extends over all of the light-radiating endface.

In one embodiment, the diffusion barrier has a thickness ranging from about 1 nm to about 10 μm, for example, from about 10 nm and about 100 nm.

In one embodiment, the diffusion barrier is made of a barrier material including a dielectric, a carbon-based material, a metal, a metalloid, a metal oxide, an alloy, a composite material, or any combination thereof. In one embodiment, the diffusion barrier is made of a barrier material including a ceramic compound, for example, a carbide, a nitride, a boride, an oxide, or any combination thereof. In one embodiment, the ceramic compound includes silicon nitride, silicon oxynitride, silicon carbide, boron nitride, silicon carbide, boron carbide, tungsten carbide, or any combination thereof.

In one embodiment, the optical fiber is made of a fluoride glass, for example, a fluorozirconate glass including $ZrF_4$ as a major component, such as ZBLAN ($ZrF_4$—$BaF_2$—$LaF_3$—$AlF_3$—NaF), or a fluoroaluminate glass including $AlF_3$ as a major component, or a fluoroindate glass including $InF_3$ as a major component, or a fluorophosphate glass including $P_2O_5$—$AlF_3$ as a major component, or any combination thereof.

In one embodiment, the optical fiber is made of a chalcogenide glass, for example, a sulfide glass including $As_2S_3$ as a major component, or a selenide glass including $As_2Se_3$ as a major component, or a telluride glass including GeTe as a major component, or a mixture thereof forming a multi-material glass, such as GeAsTeSe, or any combination thereof.

In another embodiment, the optical fiber is made of an oxide glass, for example, a germanium-oxide glass including $GeO_2$ as major component, or a lead-germanate glass including $GeO_2$—PbO as a major component, or a phosphate glass including $P_2O_5$ as major component, or a BGG glass including BaO—$Ga_2O_3$—$GeO_2$ as a major component, or any combination thereof.

In another embodiment, the optical fiber is made of a crystal material capable of transmitting mid-infrared radiation. Non-limiting examples of crystal materials that can support mid-infrared transmission include monocrystalline materials, such as single-crystal sapphire ($Al_2O_3$) and yttrium aluminum garnet (YAG; $Y_3Al_5O_{12}$), and polycrystalline materials, such as halide materials, for example, silver halides.

In one embodiment, the light-radiating endface is an endface of the optical fiber. However, in another embodiment, the light-radiating endface is an endface of an endcap connected to the optical fiber. In one embodiment, the endcap is made of an endcap material that is less permeable to OH diffusion than the mid-infrared-transparent material of the optical fiber.

In one embodiment, the diffusion barrier is a thin-film coating having a thickness sufficient to impart OH-diffusion resistance to the optical fiber product. For example, the thickness of the thin-film coating can range from about 1 nm to about 10 μm, depending on the endcap composition, particularly between 10 nm and 100 nm. It is appreciated that various types of mid-infrared-transparent and OH-diffusion-resistant barrier materials can be used to form the diffusion barrier. Non-limiting examples include dielectrics (e.g., crystals, glasses, ceramics, and polymers); carbon-based materials, such as diamond; metals, such as gold, aluminum, tantalum, titanium, and cobalt; metalloids, such as boron, silicon, and germanium; metal oxides, such as Si—TiN—O; alloys; composite materials; and mixtures thereof. In one embodiment, the barrier material is a ceramic compound, such as a carbide, a nitride, a boride, an oxide, or a mixture thereof. Non-limiting examples of such ceramic compounds include silicon nitride, silicon oxynitride, silicon carbide, boron nitride, silicon carbide, boron carbide, tungsten carbide, and the like.

In accordance with another aspect, there is provided an optical fiber product. The optical fiber product includes: an optical fiber made of a fiber-optic material and configured for propagation of mid-infrared radiation; and an endcap having a proximal endface coupled to the optical fiber for receiving therefrom the mid-infrared radiation, a distal endface for radiating the mid-infrared radiation outside the optical fiber product, and an endcap body extending and configured for propagation of the mid-infrared radiation from the proximal endface to the distal endface, the endcap being made of an endcap material that has no or a low amount of fluoride and that is less permeable to OH diffusion than the fiber-optic material.

In one embodiment, the fiber-optic material includes a glass material. For example, the glass material may include a fluoride-based glass, a chalcogenide-based glass, a chalcohalide-based glass, an oxide-based glass, a tellurite-based glass, or any combination thereof. In another embodiment, the fiber-optic material includes a crystal material.

In one embodiment, the endcap material includes a glass material. For example, the glass material may include an oxide-based glass, such as silica, an aluminosilicate-based glass, a phosphosilicate-based glass, an aluminophosphosilicate-based glass, a germanium-oxide-based glass, a lead-germanate-based glass, a tellurium-oxide-based glass, or any combination thereof. As another example, the glass material may include a barium gallium germanate glass, a tellurite-based glass, a chalcogenide-based glass, or any combination thereof.

In one embodiment, endcap material includes a crystal material. For example, the crystal material may include an oxide-based crystal material, such as sapphire, a garnet crystal material, or a combination thereof.

In one embodiment, the endcap material has a molar proportion of fluoride or fluoride-based compounds that is less than 20 mol %, or less than 10 mol %. In one embodiment, the endcap material contains no or trace amounts of fluoride or fluoride-based compounds.

In one embodiment, the endcap has a length ranging from about 50 μm to about 6 mm.

In one embodiment, the endcap has a coreless structure. In another embodiment, the endcap has a core-clad structure.

In one embodiment, the distal endface of the endcap is perpendicular to a longitudinal fiber axis of the optical fiber product. In another embodiment, the distal endface of the endcap is oblique to a longitudinal fiber axis of the optical fiber product.

In one embodiment, the optical fiber is made of a fluoride glass, for example, a fluorozirconate glass including $ZrF_4$ as a major component, such as ZBLAN ($ZrF_4$—$BaF_2$—$LaF_3$—$AlF_3$—NaF), or a fluoroaluminate glass including $AlF_3$ as a major component, or a fluoroindate glass including $InF_3$ as a major component, or a fluorophosphate glass including $P_2O_5$—$AlF_3$ as a major component, or any combination thereof.

In another embodiment, the optical fiber is made of a chalcogenide glass, for example, a sulfide glass including $As_2S_3$ as a major component, or a selenide glass including $As_2Se_3$ as a major component, or a telluride glass including GeTe as a major component, or a mixture thereof to form a multi-material glass such as GeAsTeSe, or any combination thereof.

In another embodiment, the optical fiber is made of an oxide glass, for example, a germanium-oxide glass including $GeO_2$ as major component, or a lead-germanate glass including $GeO_2$—PbO as a major component, or phosphate glass including $P_2O_5$ as major component, or BGG glass including BaO—$Ga_2O_3$—$GeO_2$ as a major component, or any combination thereof.

In another embodiment, the optical fiber is made of a crystal material capable of transmitting mid-infrared radiation. Non-limiting examples of crystal materials that can support mid-infrared transmission include monocrystalline materials, such as single-crystal sapphire ($Al_2O_3$) or yttrium aluminum garnet (YAG; $Y_3Al_5O_{12}$), and polycrystalline materials, such as halide materials, for example, silver halides.

In one embodiment, the endcap material is made of an oxide-based glass material, such as silica ($SiO_2$), an aluminosilicate-based glass, a phosphosilicate-based glass material, an aluminophosphosilicate-based glass material, a germanium-oxide-based glass material, a lead-germanate-based glass material, and a tellurium-oxide-based glass material. In another embodiment, the endcap material is made of another type of non-fluoride-based glass material, such as a BGG glass material, a tellurite-based glass material, and a chalcogenide-based glass material. In another embodiment, the endcap material can be a non-glass-based material, non-limiting examples of which include oxide-based crystal materials, such as sapphire ($Al_2O_3$), yttrium aluminum garnet (YAG; $Y_3Al_5O_{12}$), and other types of garnet crystal materials; and other types of crystal materials, such as zinc selenide (ZnSe), and diamond.

In accordance with another aspect, there is provided a fiber-based laser oscillator, laser amplifier, or laser beam delivery system including an optical fiber product as disclosed herein. In such embodiments, the optical fiber can include a gain region, for example, a laser-active region (e.g., a rare-earth doped active region) or a non-linear gain region, that defines a gain medium that can be stimulated to emit laser radiation by optical pumping.

Other objects, features and advantages of the present description will become more apparent upon reading of the following non-restrictive description of specific embodiments thereof, given by way of example only with reference to the appended drawings. Although specific features described in the above summary and in the detailed description below may be described with respect to specific embodiments or aspects, it should be noted that these specific features can be combined with one another unless stated otherwise.

BRIEF DESCRIPTION OF THE DRAWINGS

FIGS. 12(a) to 12(f) are photographs of fiber endcaps tested in the study.

FIG. 15(a): comparison between $Si_3N_4$-coated and uncoated $ZrF_4$ endcaps ($Si_3N_4$ coating thickness: 25 nm; 3-µm output power: 7 W). FIG. 15(b): comparison between $Si_3N_4$-coated and uncoated $AlF_3$ endcaps ($Si_3N_4$ coating thickness: 25 nm; 3-µm output power: 7 W). FIG. 15(c): comparison between $Si_3N_4$-coated and uncoated $Al_2O_3$ endcaps ($Si_3N_4$ coating thickness: 100 nm; 3-µm output power: 20 W).

DETAILED DESCRIPTION

Figure 1:
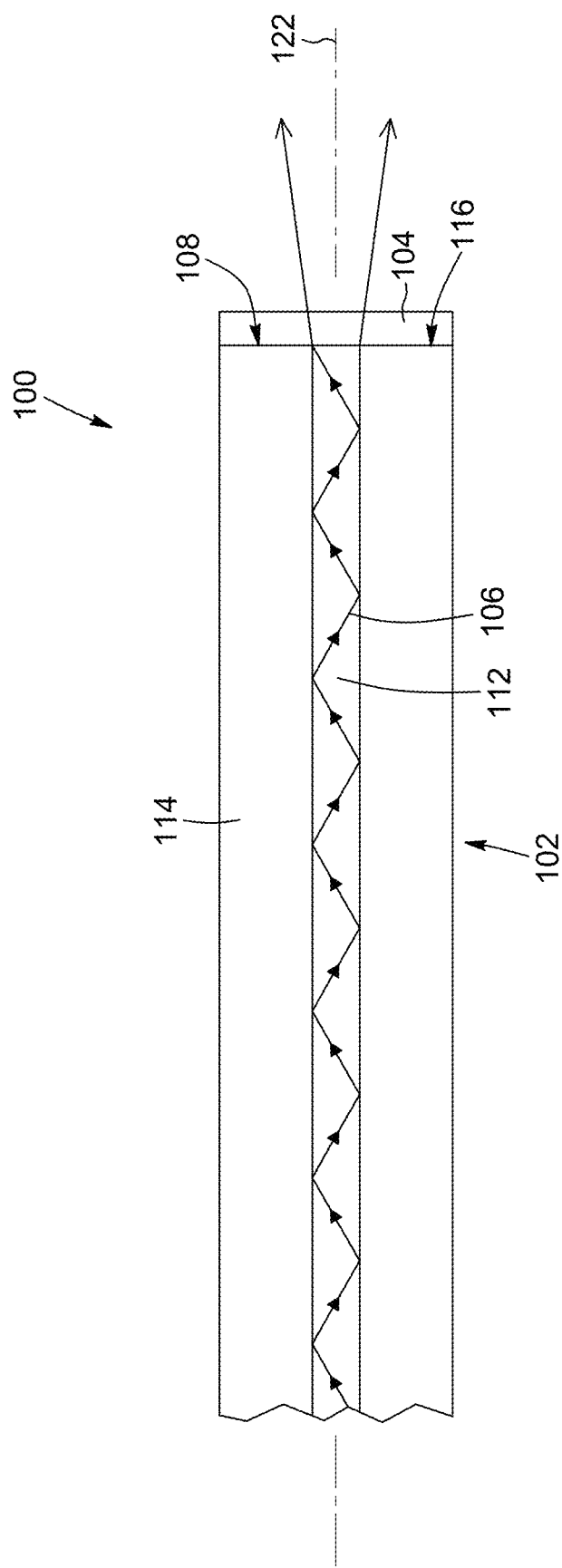
FIG. 1 is a schematic representation of an optical fiber product, in accordance with a possible embodiment.

In the present description, similar features in the drawings have been given similar reference numerals. To avoid cluttering certain figures, some elements may not be indicated if they were already identified in a preceding figure. It is appreciated that the elements of the drawings are not necessarily depicted to scale since emphasis is placed on clearly illustrating the elements and structures of the present embodiments. Furthermore, positional descriptors indicating the location and/or orientation of one element with respect to another element are used herein for ease and clarity of description. Unless otherwise indicated, these positional descriptors should be taken in the context of the figures and should not be considered limiting. It is appreciated that such spatially relative terms are intended to encompass different orientations in the use or operation of the present embodiments, in addition to the orientations exemplified in the figures. Furthermore, when a first element is referred to as being "on", "above", "below", "over", or "under" a second element, the first element can be either directly or indirectly on, above, below, over, or under the second element, respectively, such that one or multiple intervening elements may be disposed between the first element and the second element.

The terms "a", "an" and "one" are defined herein to mean "at least one", that is, these terms do not exclude a plural number of items unless stated otherwise.

Terms such as "substantially", "generally", and "about", which modify a value, condition, or characteristic of a feature of an exemplary embodiment, should be understood to mean that the value, condition, or characteristic is defined within tolerances that are acceptable for the proper operation of this exemplary embodiment for its intended application or that fall within an acceptable range of experimental error. In particular, the term "about" generally refers to a range of numbers that one skilled in the art would consider equivalent to the stated value (e.g., having the same or equivalent function or result). In some instances, the term "about" means a variation of ±10 percent of the stated value. It is noted that all numeric values used herein are assumed to be modified by the term "about", unless stated otherwise.

The terms "match", "matching" and "matched" are intended to refer herein to a condition in which two elements are either the same or within some predetermined tolerance of each other. That is, these terms are meant to encompass not only "exactly" or "identically" matching the two elements, but also "substantially", "approximately", or "subjectively" matching the two elements, as well as providing a higher or best match among a plurality of matching possibilities.

The terms "connected" and "coupled", and derivatives and variants thereof, are intended to refer herein to any connection or coupling, either direct or indirect, between two or more elements, unless stated otherwise. The connection or coupling between the elements may be, for example, mechanical, optical, electrical, thermal, magnetic, chemical, fluidic, logical, operational, or any combination thereof.

The present description generally relates to mid-infrared optical fiber products with enhanced resistance to OH diffusion, as can be caused when ambient water vapor reacts with an exposed light-radiating fiber endface to induce fiber tip degradation or failure.

In accordance with an aspect, the disclosed optical fiber product may include an optical fiber and a diffusion barrier. The optical fiber may be made of a mid-infrared-transparent material and be configured for guided propagation of mid-infrared radiation therein toward a light-radiating endface. Depending on the application, the light-radiating endface may be an endface of the optical fiber itself or the endface of a fiber endcap spliced, fused, or otherwise connected or coupled to the optical fiber. The diffusion barrier may be deposited, formed, or otherwise provided on the light-radiating endface and configured for allowing the transmission of the mid-infrared radiation emanating from the light-radiating endface and for preventing OH diffusion through to the light-radiating endface. When the optical fiber is terminated with a fiber endcap, the endcap may be made of an endcap material that is less permeable to OH diffusion than the mid-infrared-transparent material of the optical fiber.

In the present description, the terms "prevent" and "preventing", and other variants and derivatives thereof, are used in a broad sense to describe a diffusion barrier that substantially or completely restricts OH diffusion therethrough. Thus, the terms "prevent" and "preventing" are intended to encompass reducing, decreasing, inhibiting, impeding, hindering, mitigating, stopping, and/or eliminating OH diffusion through the diffusion barrier. For greater clarity, the terms "prevent" and "preventing" do not necessarily mean that, in an exemplary embodiment, there is absolutely no OH diffusion occurring through the diffusion barrier, but rather that OH diffusion through the diffusion barrier is restricted or reduced to a level that is sufficiently low for the proper operation of this exemplary embodiment for its intended application.

In accordance with another aspect, the disclosed optical fiber product may include an optical fiber terminated with a fiber endcap. The optical fiber may be made of a mid-infrared-transparent fiber-optic material and be configured for guided propagation of mid-infrared radiation therein. The fiber endcap may define an optical medium or material extending between a proximal endface, coupled to the optical fiber for receiving therefrom the mid-infrared radiation, and a distal endface, defining a light-radiating endface for radiating the mid-infrared radiation outside the optical fiber product. The fiber endcap may be made of an endcap material that has no or a low amount of fluoride and that is less permeable to OH diffusion than the mid-infrared-transparent fiber-optic material.

The present techniques may be used or implemented in various applications that may require or benefit from mid-infrared optical fibers with enhanced resistance to OH diffusion and concomitant mitigation of fiber tip degradation, which may provide improved fiber performance in terms of lifetime and output power. The techniques disclosed herein may be applied to or implemented in various types of mid-infrared fiber laser oscillator and amplifier systems as well as in other optical systems that may use or rely on mid-infrared fibers, such as optical parametric oscillators (OPOs). Such fiber laser oscillator and amplifier systems typically involve double-clad rare-earth-doped fluoride fibers that are optically pumped (e.g., by a diode pump source) to generate mid-infrared laser emission around 3 µm. Non-limiting examples of fields where the present techniques may be used include, to name a few, materials processing, medicine and surgery, metrology, spectroscopy, sensing and imaging, security and defense, telecommunications, and countermeasure applications.

In the present description, the terms "light" and "optical", and variants and derivatives thereof, are intended to refer to radiation in any appropriate region of the electromagnetic spectrum, and are not limited to visible light. By way of example, in some embodiments, the terms "light" and "optical" may encompass infrared radiation, particularly mid-infrared radiation. Infrared radiation is commonly divided into the near-infrared region for wavelengths ranging from about 0.7 to 2.5 µm; the mid-infrared region for wavelengths ranging from about 2.5 to 25 µm; and the far-infrared region for wavelengths above about 25 µm. It is appreciated that the definitions of different infrared regions in terms of spectral ranges, as well as their limits, may vary depending on the technical field under consideration, and are not meant to limit the scope of application of the present techniques. In particular, the term "mid-infrared" is used throughout the present description. The definition of the term "mid-infrared" remains somewhat unsettled in the art, with the boundaries between near-infrared, mid-infrared, and far-infrared regions varying in different technical fields. As used herein, the term "mid-infrared" is intended to refer to the region of the electromagnetic spectrum encompassing at least wavelengths ranging from about 2.5 µm to about 25 µm. In certain technical fields, the boundary between mid-infrared and near-infrared may correspond to wavelengths as long as 50 µm, while the boundary between mid-infrared and far-infrared may correspond to wavelengths as short as 1.5 µm.

The optical fibers disclosed herein may be a made from a variety of mid-infrared-transparent materials, whether glassy or crystalline, that can allow guided propagation of one or more modes at mid-infrared wavelengths.

In some embodiments, the mid-infrared-transparent fiber-optic material may be a glass material having a transmittance window in the mid-infrared. Non-limiting examples of classes of possible glass materials include fluoride-based glasses; chalcogenide-based glasses; chalcohalide-based glasses; oxide-based glasses; tellurite-based glasses; and other glass materials with similar physical properties, and any combination thereof. Depending on the application, the glass material may be doped or undoped.

In some embodiments, the mid-infrared-transparent fiber-optic material may be a fluoride-based glass. For example, the fluoride-based glass may include a fluorozirconate glass having a composition including $ZrF_4$, such as a ZBLA glass, a ZBLAN glass, and a ZBLALi glass; or a fluoroaluminate glass having a composition including $AlF_3$; or a fluoroindate glass having a composition including $InF_3$; or a fluorophosphate glass having a composition including $P_2O_5$—$AlF_3$; a fluoro-sulfo-phosphate glass; or any combination thereof.

In some embodiments, the mid-infrared-transparent fiber-optic material may be a chalcogenide-based glass having a composition including $As_2S_3$, $As_2Se_3$, $As_2Te_3$, AsSSe, AsSTe, GaLaS, GeTe, GeAsS, GeAsSe, or any combination thereof. For example, the chalcogenide-based glass may include a sulfide glass including $As_2S_3$ as a major component; a selenide glass including $As_2Se_3$ as a major component; a telluride glass including GeTe as a major component; a mixture thereof forming a multi-material glass, such as GeAsTeSe; or any combination thereof.

In some embodiments, the mid-infrared-transparent fiber material may be an oxide-based glass, for example a germanium-oxide glass having a composition including $GeO_2$; a lead-germanate glass having a composition including $GeO_2$—$PbO$; a phosphate glass having a composition including $P_2O_5$; a barium gallium germanate (BGG) glass having a composition including $BaO$—$Ga_2O_3$—$GeO_2$; or any combination thereof.

In some applications, several mid-infrared-transparent glass materials—including various fluoride-based, chalcogenide-based, chalcohalide-based glasses, and tellurite-based glasses such as those mentioned above—may be referred to as "low phonon energy glasses". In the present description, the term "low phonon energy glass" is intended to refer to any glass having a maximum phonon energy lower than the phonon energy of silica-based glass, that is, lower than about 1100 $cm^{-1}$. Optical fibers made of a low phonon energy glass generally have a transmittance window extending in the mid-infrared (e.g., from about 2.5 µm to longer wavelengths).

In some embodiments, the mid-infrared-transparent fiber-optic material may not be a glass material. For example, the optical fiber may be made of a crystal material capable of transmitting mid-infrared radiation. Non-limiting examples of crystal materials that can support mid-infrared transmission include monocrystalline materials, such as single-crystal sapphire ($Al_2O_3$) or yttrium aluminum garnet (YAG; $Y_3Al_5O_{12}$), or any combination thereof, and polycrystalline materials, such as halide materials, for example silver halides.

Various implementations of the present techniques are described below with reference to the figures.

Figure 3:
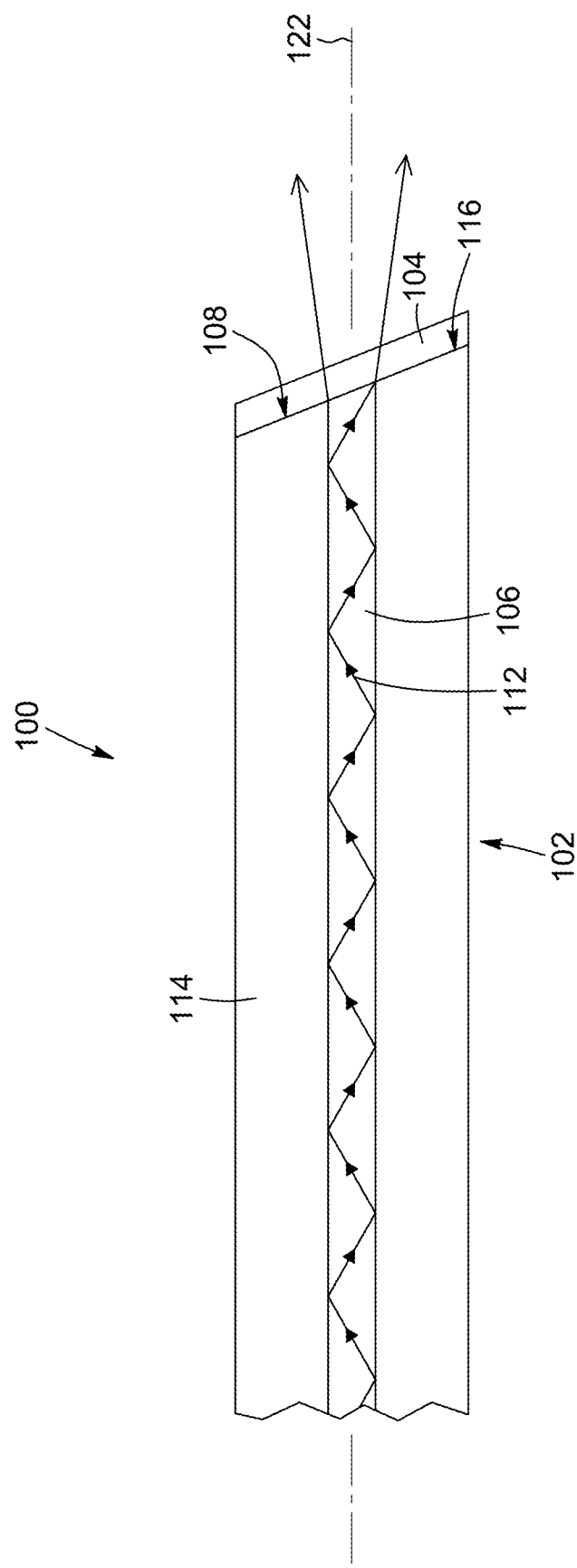
FIG. 3 is a schematic representation of an optical fiber product, in accordance with another possible embodiment.
Figure 4:
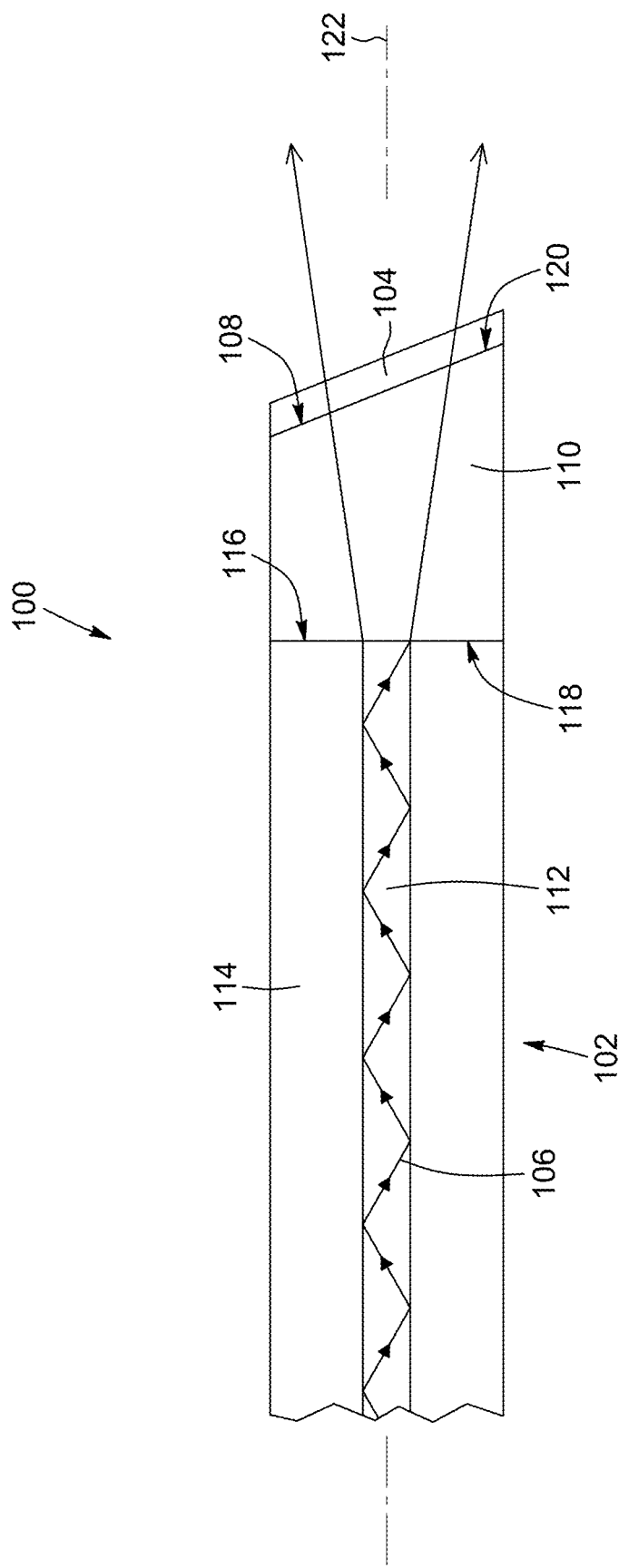
FIG. 4 is a schematic representation of an optical fiber product, in accordance with another possible embodiment.
Figure 5:
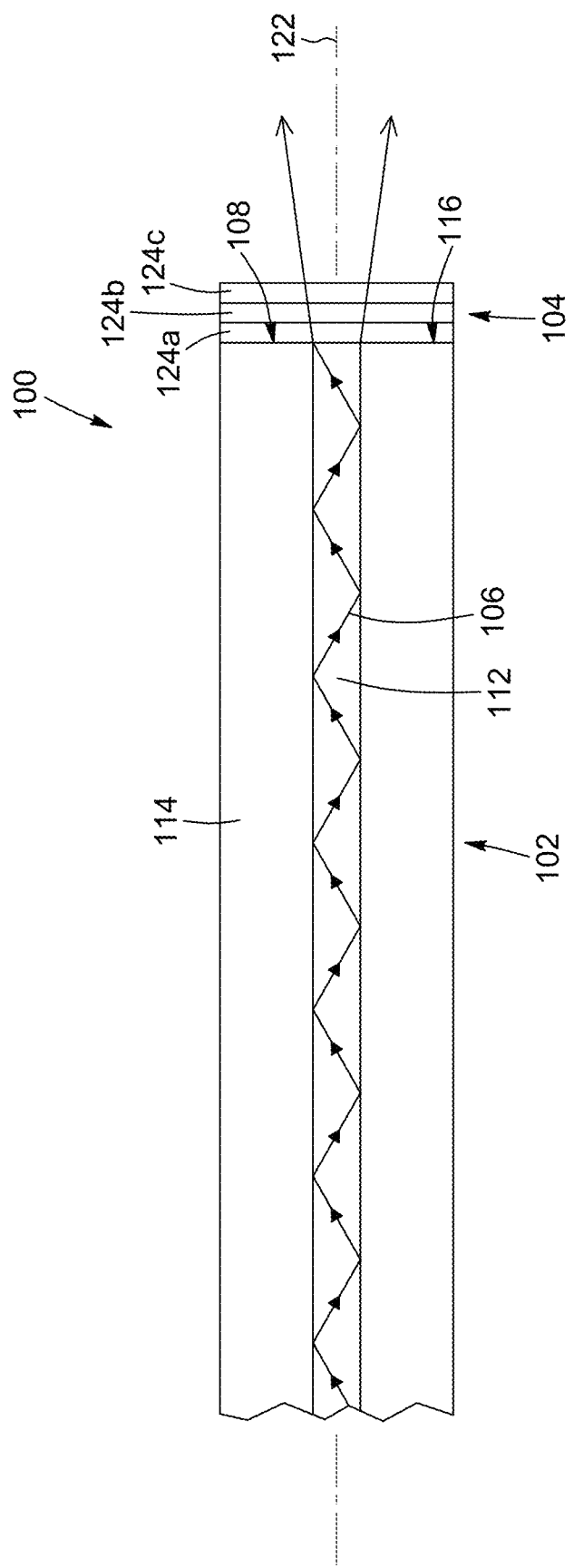
FIG. 5 is a schematic representation of an optical fiber product, in accordance with another possible embodiment.
Figure 6:
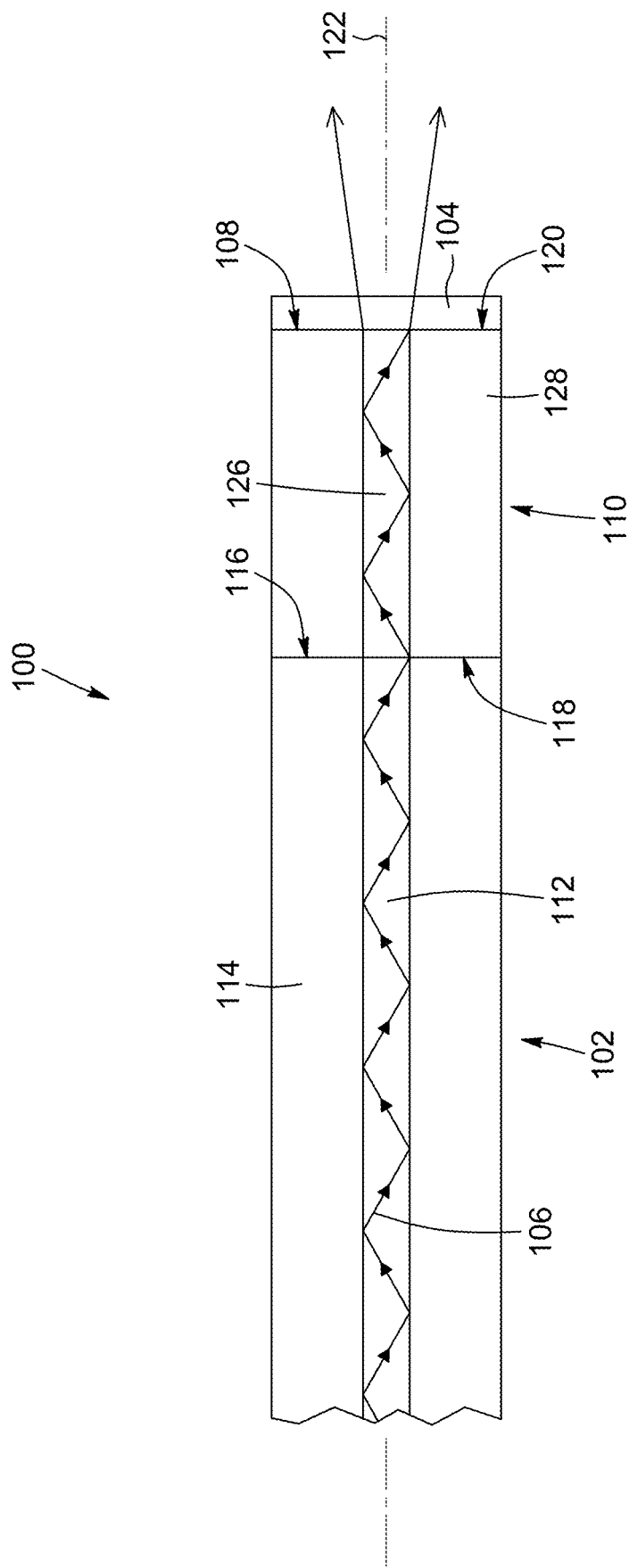
FIG. 6 is a schematic representation of an optical fiber product, in accordance with another possible embodiment.

Referring to FIG. 1, there is depicted a schematic representation of an optical fiber product 100, in accordance with a possible embodiment. The optical fiber product 100 generally includes an optical fiber 102 and a diffusion barrier 104. The optical fiber 102 is made of a mid-infrared-transparent fiber-optic material, such as those mentioned above. The optical fiber 102 is configured for supporting guided propagation of mid-infrared radiation 106 therein toward a light-radiating endface 108. In the embodiment of FIG. 1, the light-radiating endface 108 is an endface of the optical fiber 102 itself. However, in other embodiments, such as the one depicted in FIG. 2, the light-radiating endface 108 may be an endface of a fiber endcap 110 serially connected to the optical fiber 102. Depending on the application, the light-radiating endface 108 may be perpendicular to a longitudinal fiber axis 122 of the optical fiber product 100, as in FIGS. 1 and 2, or oblique to the longitudinal fiber axis 122, as in FIGS. 3 and 4. The diffusion barrier 104 is disposed on the light-radiating endface 108. The diffusion barrier 104 is configured for transmitting therethrough the mid-infrared radiation 106 emanating from the light-radiating endface 108. The diffusion barrier 104 is also configured for preventing OH diffusion therethrough toward the light-radiating endface 108. The composition, structure, configuration, and operation of these and other possible components of the optical fiber product 100 will be described in greater detail below.

Figure 10:
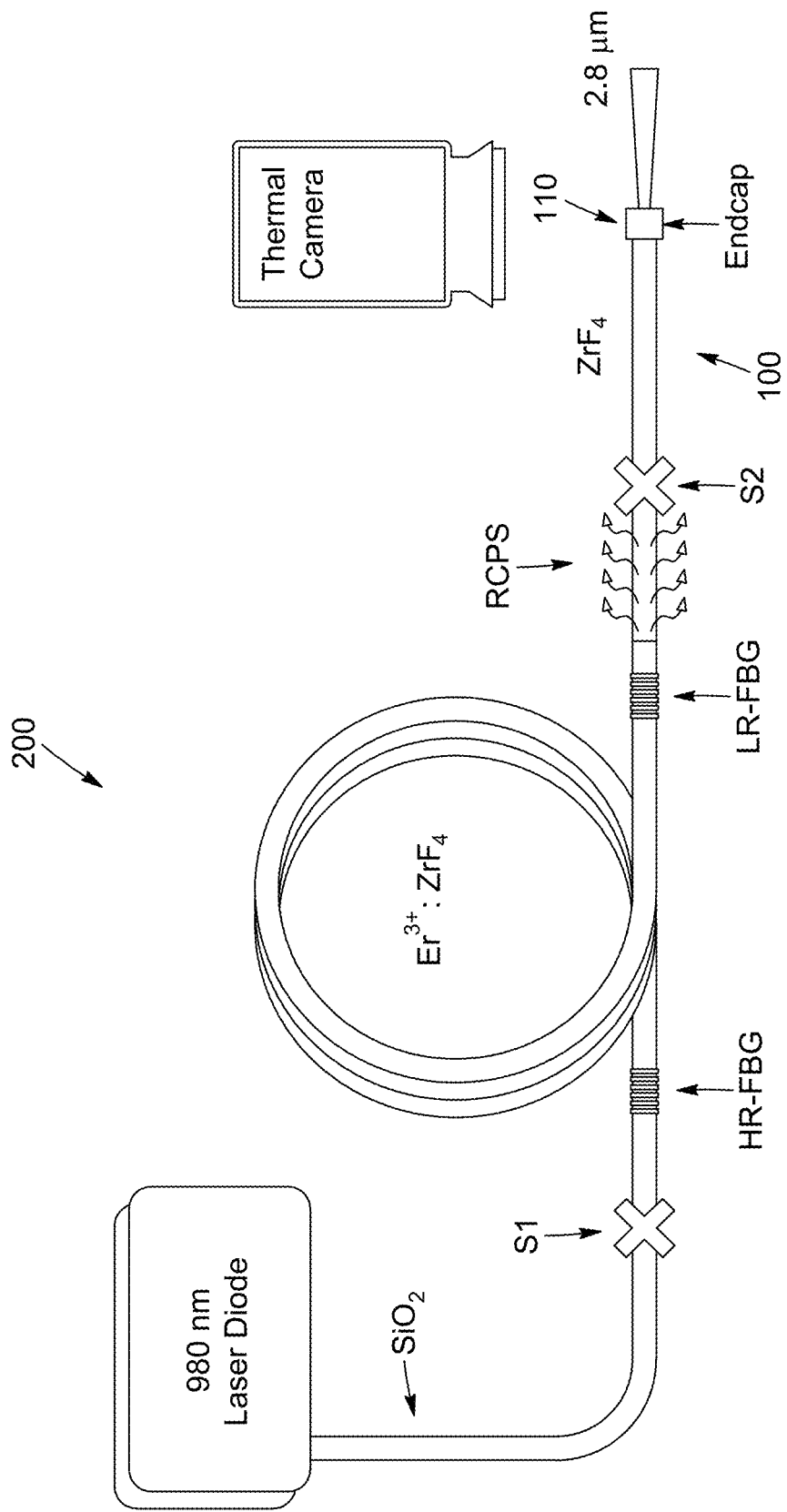
FIG. 10 is a schematic representation of an experimental setup used in a study to monitor the degradation over time of different endcaps subjected to 20 W of output power at 3 µm.
Figure 11:
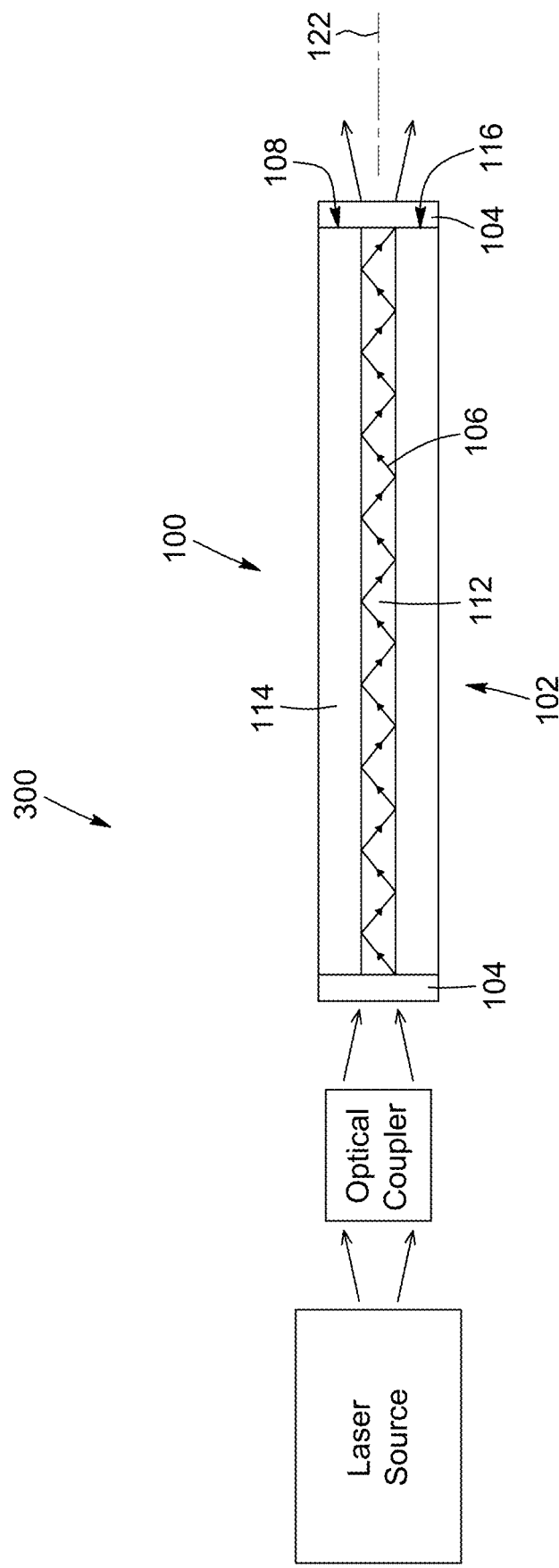
FIG. 11 is a schematic representation of a laser beam delivery system including an optical fiber product.

It is appreciated that the optical fiber product 100 of FIG. 1 may be provided as a component of a mid-infrared fiber laser oscillator or amplifier system 200, such as the one described below with reference to FIG. 10, or another system, for example, as a laser light delivery cable in laser beam delivery system 300, as depicted schematically in FIG. 11. It is also appreciated that in fiber laser systems, the optical fiber 102 may include a gain region that can be stimulated by optical pumping to emit mid-infrared radiation 106; undoped, passive regions to propagate light from and to the active region; reflectors, such as Bragg gratings, provided on either side of the gain region; a pump stripper to remove residual pump power; splice junctions; and the like. However, the embodiment of FIG. 1—as well as those of FIGS. 2 to 9—depicts only a downstream portion of the optical fiber product 100, which includes the light-radiating endface 108 through which the mid-infrared radiation 106 is radiated out, for example, as laser radiation. It is appreciated that the general principles underlying the configuration, operation, and applications of mid-infrared fiber laser oscillators and amplifiers are known in the art and need not be described in greater detail herein. Examples of mid-infrared fiber laser oscillators and amplifiers are described in the following co-assigned patent documents, the entire contents of which are incorporated herein by reference: U.S. Pat. No. 10,084,287 B2 and Int'l Pat. Appl. Pub. No. WO 2011/009198 A1.

In FIG. 1, the optical fiber 102 includes a core 112 and a cladding 114 surrounding the core 112. A protective polymer coating (not shown) may be disposed around the cladding 114. The core 112 forms a light-guiding path along which the mid-infrared radiation 106 is guided. The core 112 is made of a core material having a refractive index higher than the refractive index of the cladding material so that light can be guided therealong by total internal reflection at the interface between the core 112 and the cladding 114, as depicted schematically in FIG. 1. Depending on the application, the core 112 may be single mode or multimode, centered or off-centered relative to the fiber axis 122, and configured to support different polarization states. In some implementations, multicore optical fibers may be used. The core 112 and the cladding 114 may have various compositions and refractive index profiles (e.g., graded-index profile or step-index profile). In one embodiment, the core 112 and the cladding 114 may be made of a mid-infrared-transparent glass material, such as a fluoride glass, with the core material having a refractive index higher than that of the cladding material. For example, the core 112 may contain one or more index-changing dopants to raise its refractive index relative to that of the cladding 114. The core 112 may have a diameter ranging from about 3 µm to about 450 µm, while the cladding 114 may have a diameter ranging from about 80 µm to about 500 µm, although other core and cladding sizes may be used in other embodiments. Depending on the application, the core 112 and the cladding 114 may each have a circular or a noncircular cross-section.

The cladding 114 may include one or more cladding layers. Fiber lasers commonly use double-clad optical fibers, which include a core carrying the laser signal, an inner pump cladding surrounding the core and carrying the pump signal, and an outer cladding surrounding the pump cladding. In such applications, the core, inner pump cladding, and outer cladding are made of materials with different refractive indices, selected so that the laser signal and the pump signal are guided by total internal reflection inside the core and inside the pump cladding, respectively. This is achieved with the pump-cladding index being lower than the core index and higher than the outer-cladding index.

Depending on the application, the optical fiber 102 may be a passive fiber or an active fiber including a gain medium for providing optical amplification. The gain medium may be doped with rare-earth elements (e.g., ytterbium, erbium, holmium, thulium, praseodymium, neodymium, dysprosium, and the like, and combinations thereof) or other dopants, as the case may be. As noted above, when used in fiber lasers, the optical fiber 102 may include both active and passive segments along its length.

It is appreciated that, in general, the composition, cross-sectional shape and size, refractive index profile, number of cores, number of guided modes, passive or active operation mode, operating wavelength range, polarization-maintaining (PM) properties, and other core, cladding, and fiber properties and characteristics may be varied in accordance with a specified application.

Referring still to FIG. 1, the diffusion barrier 104 disposed on the light-radiating endface 108 is configured for preventing OH compounds (e.g., contaminants and impurities containing hydroxide ions and/or hydroxy groups) from diffusing therethrough and reaching—and potentially degrading—the optical fiber 102. It has been found that without the provision of the diffusion barrier 104, the light-radiating endface 108 is exposed to the surrounding environment such that ambient water vapor (or liquid water, in some instances) may interact with the glass constituents of the optical fiber 102 and increase the concentration of OH compounds on its exposed endface 108. Since many mid-infrared-transparent glasses, including $ZrF_4$-based fluoride glasses, have a relatively high OH permeability, these OH compounds tend to diffuse inside the optical fiber 102. The OH compounds having diffused inside the optical fiber 102 may absorb part of the mid-infrared radiation 106 exiting the optical fiber 102 at the light-radiating endface 108, due to the strong mid-infrared OH absorption region near 3 μm. The absorbed radiation may heat up the light-radiating endface 108, which in turn may enhance the OH diffusion process, and so forth. This cascading feedback loop may gradually degrade the endface quality of the optical fiber 102 and eventually cause its failure after a certain period of operation.

In one embodiment, the diffusion barrier 104 may be a thin-film coating formed on the light-radiating endface 108 and having a thickness sufficient to impart OH-diffusion resistance to the optical fiber product 100. For example, depending on the endcap composition, the thickness of the thin-film coating can range from about 1 nm to about 10 μm, particularly between 10 nm and 100 nm. In general, the thickness of the diffusion barrier 104 may be adjusted to ensure or help ensure OH impermeability, mid-infrared transparency, and mechanical integrity. Depending on the application, the thin-film coating forming the diffusion barrier 104 can include a single thin-film layer, as in FIGS. 1 to 4 and 6, or multiple thin-film layers 124a, 124b, 124c, as in FIG. 5. Furthermore, the diffusion barrier 104 may extend over part or all of the light-radiating endface 108.

It is appreciated that various types of mid-infrared-transparent and OH-diffusion-resistant barrier materials may be used as the diffusion barrier 104. Non-limiting examples include dielectrics (e.g., crystals, glasses, ceramics, and polymers); carbon-based materials, such as diamond; metals, such as gold, aluminum, tantalum, titanium, and cobalt; metalloids, such as boron, silicon, and germanium; metal oxides, such as Si—TiN—O; alloys; composite materials; and mixtures and combinations thereof. In one embodiment, the barrier material may be a ceramic compound, such as a carbide, a nitride, a boride, an oxide, or a combination thereof. Non-limiting examples of such ceramic compounds include silicon nitride, silicon oxynitride, silicon carbide, boron nitride, silicon carbide, boron carbide, tungsten carbide, and the like, and any combination thereof. It is appreciated that the choice of a suitable barrier material may be made based on a number of factors, non-limiting examples of which include cost, availability of materials and deposition techniques, mechanical, thermal, and chemical stability, and compatibility with the fiber-optic material. It is also appreciated that the diffusion barrier 104 may be deposited on the light-radiating endface 10 using a variety of thin-film deposition techniques, including physical deposition techniques, such as radio frequency sputtering, reactive alternative current magnetron sputtering, thermal evaporation, and electron beam physical vapor deposition, chemical deposition techniques, such as plasma-enhanced chemical vapor deposition and low pressure chemical vapor deposition techniques, or any other appropriate deposition techniques.

Figure 2:
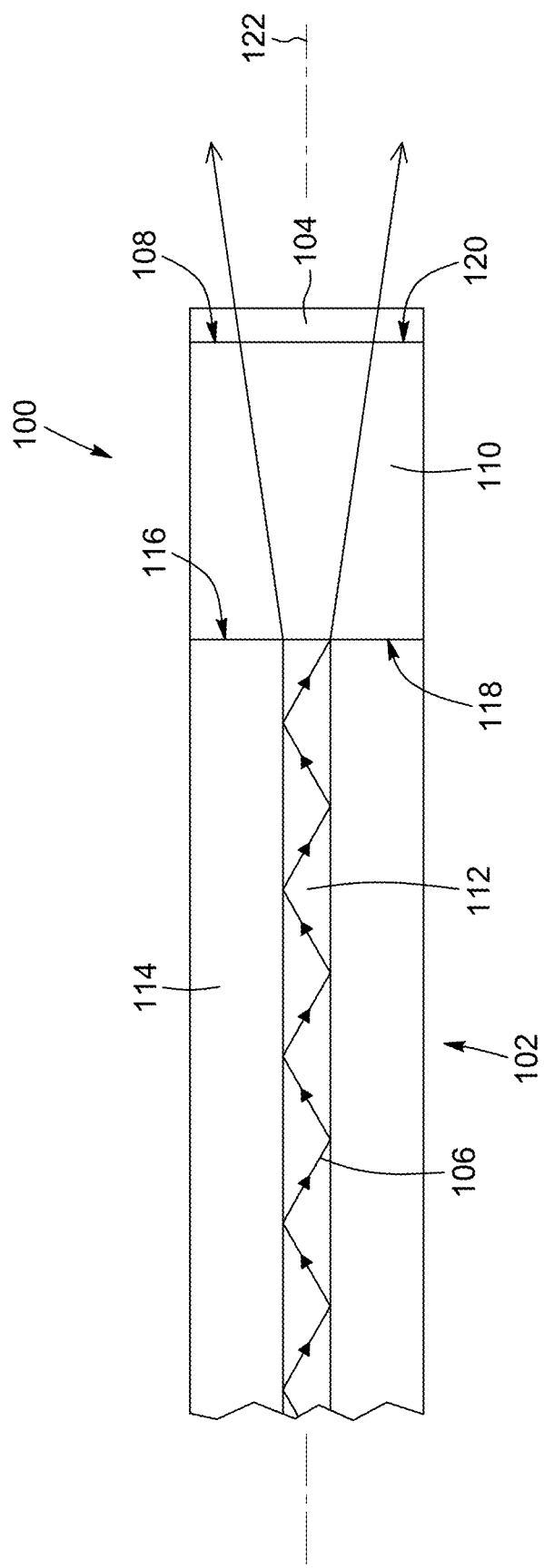
FIG. 2 is a schematic representation of an optical fiber product, in accordance with another possible embodiment.

Referring to FIG. 2, there is illustrated another embodiment of an optical fiber product 100. The embodiment of FIG. 2 shares several features with the embodiment of FIG. 1, which will not be described in detail again other than to highlight differences between them. The optical fiber product 100 of FIG. 2 includes an optical fiber 102 made of a mid-infrared-transparent material, such as those mentioned above. The optical fiber 102 has a core 112 and a cladding 114 and is configured for guided propagation of mid-infrared radiation 106 therealong. The optical fiber product 100 also includes a light-radiating endface 108 for outputting the mid-infrared radiation 106, and a diffusion barrier 104. However, in contrast to the embodiment of FIG. 1, the optical fiber product 100 further includes a fiber endcap 110 spliced, fused, or otherwise connected or coupled to the output endface 116 of the optical fiber 102. The endcap 110 defines an optical medium or material that extends between a proximal endface 118, optically coupled to the output endface 116 of the optical fiber 102 for receiving therefrom the mid-infrared radiation 106, and a distal endface 120, for radiating the mid-infrared radiation 106 out of the optical fiber product 100. It is appreciated that in the embodiment of FIG. 2, the light-radiating endface 108 of the optical fiber product 100, on which is deposited the diffusion barrier 104, corresponds not to the output endface 116 of the optical fiber 102, as in FIG. 1, but to the distal endface 120 of the endcap 110.

The endcap 110 may reduce the optical power density of the beam of mid-infrared radiation 106 at the light-radiating endface 108 by allowing the beam to expand in a controlled manner prior to exiting the optical fiber product 100. The provision of the endcap 110 may can be useful for achieving high-power generation. Furthermore, if the endcap 110 is made of an endcap material that is less permeable to OH diffusion than the mid-infrared-transparent material of the optical fiber 102, the endcap 110 may also provide, in addition to the diffusion barrier 104, an additional protection against OH diffusion into the optical fiber 102 and its potential degradation.

In one embodiment, the endcap 110 may have a circular or a noncircular cross-section, a diameter ranging from about 80 μm to about 12.5 mm, for example, between about 200 and 500 μm, and a length ranging from about 50 μm to about 6 mm, for example, between about 200 and about 750 μm, although other diameter and length values can be used in some embodiments. Depending on the application, the cross-sectional size and shape of the endcap 110 may each be the same as, or different from, those of the optical fiber 102. Furthermore, while the endcap 110 depicted in FIG. 2 has a coreless structure and its distal endface 120 is perpendicular to the longitudinal fiber axis 122, endcaps having an angled or slanted endface and/or a core-clad structure may be used in other embodiments. For example, in FIG. 4, the distal endface 120 is angled relative to the longitudinal fiber axis 122, while in FIG. 6, the endcap 110 has a core-clad structure including an endcap core 126 and an endcap cladding 128 surrounding the endcap core 126. Depending on the application, the endcap core 126 and cladding 128 may or may not have the same size and shape as the fiber core 112 and cladding 114, respectively. It is appreciated that, in general, the endcap composition, internal structure (e.g., coreless or core-clad), cross-sectional shape and size, length, longitudinal profile (e.g., straight, tapered, or widening), modal operation (i.e., single or multimode), refractive index profile, operating wavelength range, polarization-maintaining (PM) properties, and other endcap properties and characteristics may be varied in accordance with a specified application and may or may not be the same as those of the optical fiber 102.

It is noted that various endcap materials may be used. In one embodiment, the optical fiber 102 may be made of a fluoride-based glass, while the endcap 110 may be made of a fluoride-based glass that is less permeable to OH diffusion than the fluoride-based glass of the optical fiber 102. In another embodiment, the optical fiber 102 may be made of a fluoride-based glass, while the endcap 110 may be made of an endcap material, whether glassy or crystalline, that contains no or a low amount of fluoride so to avoid or mitigate the high OH permeability often associated with fluoride-based fiber-optic materials. In the present description, the term "low amount of fluoride" is intended to mean that the molar proportion of fluoride or fluoride-based compounds in the endcap material is not more than 50 mol % of its total composition, particularly less than 25 mol % of its total composition, and more particularly less than 10 mol % of its total composition. In many cases, the endcap material may contain no or very low amounts (e.g., trace or accidental amounts) of fluoride-compounds. As for the barrier material, the choice of a suitable endcap material may be made based on a number of factors, non-limiting examples of which include cost, availability of materials and deposition techniques, mechanical, thermal, and chemical stability, and compatibility with the fiber-optic material.

It is appreciated that the various types of possible mid-infrared-transparent and OH-diffusion-resistant barrier materials mentioned with respect to the embodiment of FIG. 1 may also be used to form the diffusion barrier 104 in the embodiment of FIG. 2. However, it appreciated that in this case, the choice of a suitable barrier material would generally be made based more on its compatibility with the endcap material, rather than the fiber-optic material.

Figure 7:
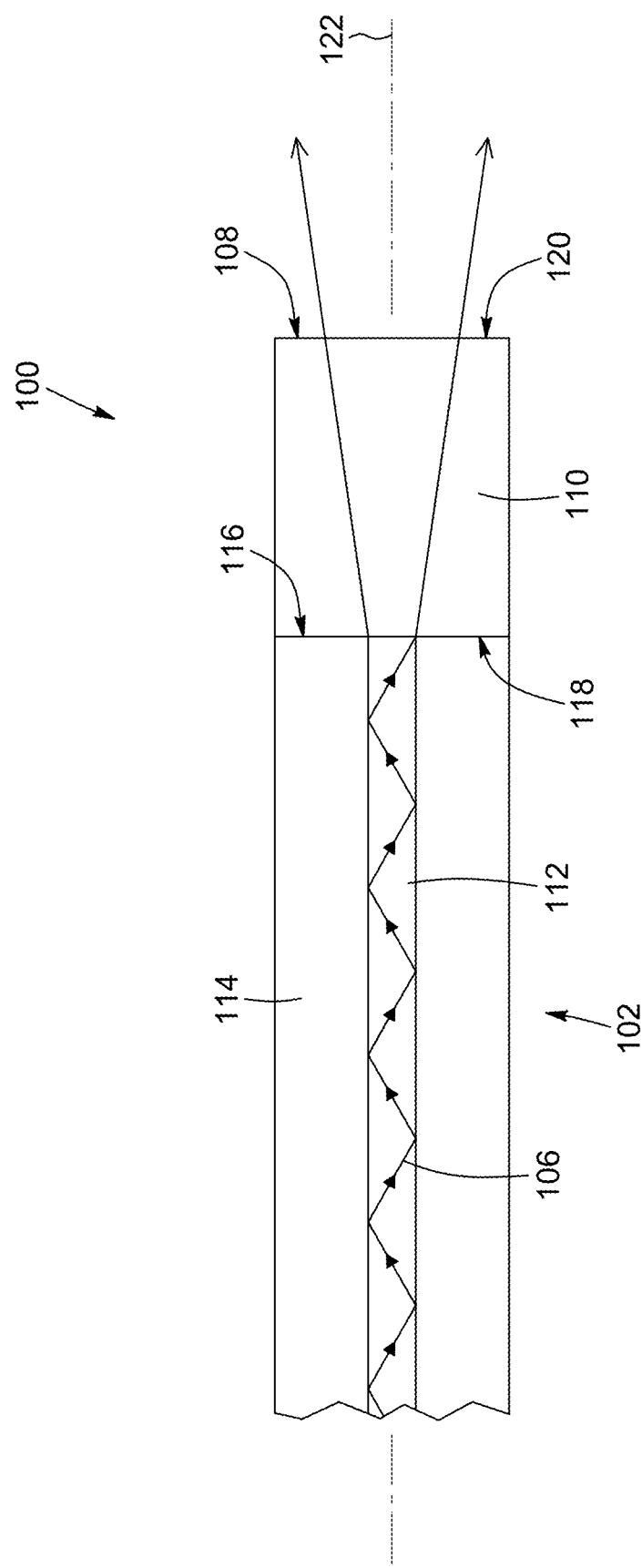
FIG. 7 is a schematic representation of an optical fiber product, in accordance with another possible embodiment.
Figure 8:
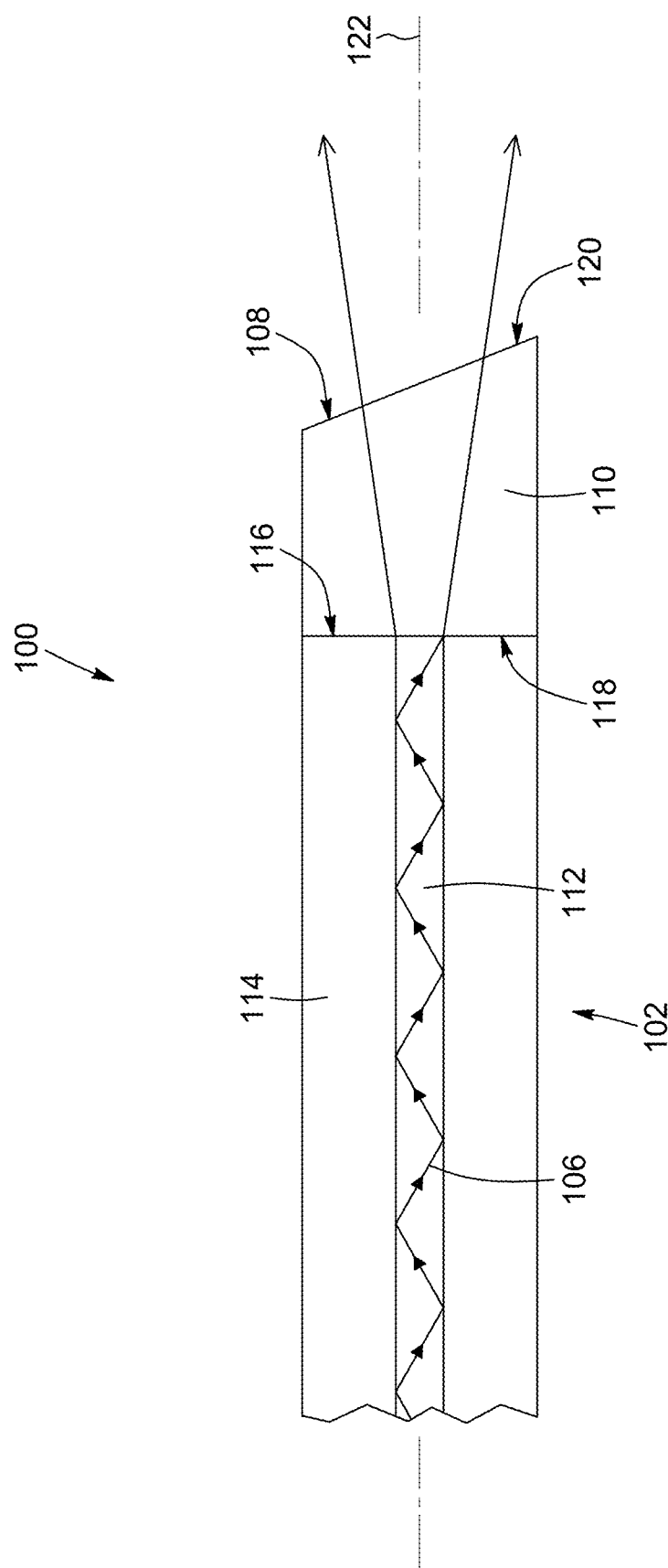
FIG. 8 is a schematic representation of an optical fiber product, in accordance with another possible embodiment.
Figure 9:
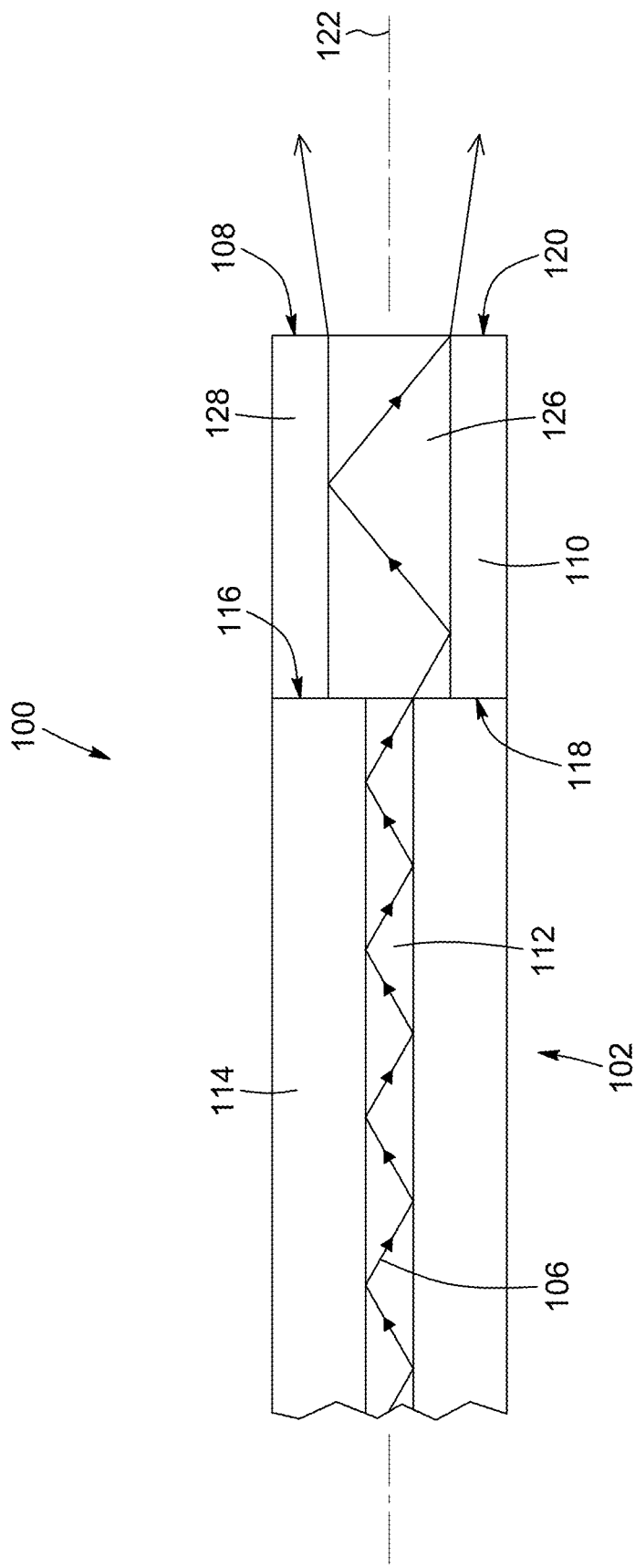
FIG. 9 is a schematic representation of an optical fiber product, in accordance with another possible embodiment.

Referring to FIG. 7, there is illustrated another embodiment of an optical fiber product 100. The embodiment of FIG. 7 shares several features with the embodiments of FIGS. 1 to 6, which will not be described in detail again other than to highlight differences between them. As in FIGS. 2, 4, and 6, the optical fiber product 100 of FIG. 7 includes an optical fiber 102 and a terminating endcap 110 spliced, fused, or otherwise connected or coupled to the output endface 116 of the optical fiber 102. The optical fiber 102 includes a core 112 and a cladding 114 surrounding the core 112. The optical fiber 102 is made of a mid-infrared-transparent material, such as a those mentioned above, and is configured for propagation of mid-infrared radiation 106 therein. The endcap 110 defines an optical medium or material that extends between a proximal endface 118 and a distal endface 120. The proximal endface 118 is coupled to the output endface 116 of the optical fiber 102 and is configured for receiving therefrom the mid-infrared radiation 106. The distal endface 120 defines a light-radiating endface 108 for radiating the mid-infrared radiation 106 outside the optical fiber product 100. As in FIG. 2, the endcap 110 in FIG. 7 may reduce the optical power density at the light-radiating endface 108 by allowing the beam of mid-infrared radiation 106 to expand in a controlled manner prior to exiting the optical fiber product 100. The endcap 110 may also provide a barrier against OH diffusion into the optical fiber 102. As noted above, the mid-infrared radiation 106 propagating in the optical fiber may be a mid-infrared laser beam that is generated by optically pumping a laser-active region of the fiber core 112 and that exits the optical fiber product 100 through the light-radiating endface 108 of the endcap 110.

In contrast to the embodiments of FIGS. 1 to 6, the embodiment of FIG. 7 does not include an OH-diffusion barrier deposited—for example, as a thin-film coating—on the light-radiating endface 108 of the optical fiber product 100. Rather, in the embodiment of FIG. 7, it is the endcap 110 that acts primarily, if not only, as a barrier for preventing OH from diffusing therethrough to reach and potentially degrade the tip of the optical fiber 102. In the illustrated embodiment, the endcap 110 is made of an endcap material that is less permeable to OH diffusion than the mid-infrared-transparent material of the optical fiber and, in particular, that has no or a low amount of fluoride. As noted above, the term "low amount of fluoride" is intended to mean that the molar proportion of fluoride or fluoride-based compounds in the endcap material does not exceed more than 50 mol % of its total composition, particularly less than 25 mol % of its total composition, more particularly less than 10 mol % of its total composition, and in many cases even significantly less than 10 mol % of its total composition (e.g., no or only trace amounts).

As noted regarding FIG. 2, the endcap 110 in FIG. 7 may have a circular or a noncircular cross-section, a diameter ranging from about 80 µm to about 12.5 mm, for example, between about 200 and 500 µm, and a length ranging from about 50 µm to about 6 mm, for example, between about 200 and 750 µm, although other diameter and length values can be used in some embodiments. Depending on the application, the cross-sectional size and shape of the endcap 110 may each be the same as, or different from, those of the optical fiber 102. Furthermore, while the endcap 110 depicted in FIG. 7 has a coreless structure and its distal endface 120 is perpendicular to the longitudinal fiber axis 122, endcaps having an angled or slanted endface and/or a core-clad structure may be used in other embodiments. For example, in FIG. 8, the distal endface 120 is angled or oblique relative to the longitudinal fiber axis 122, while in FIG. 9, the endcap 120 has a core-clad structure including an endcap core 126 and an endcap cladding 128 surrounding the endcap core 126. Depending on the application, the endcap core 126 and cladding 128 may or may not have the same size and shape as the fiber core 112 and cladding 114, respectively. It is appreciated that, in general, the endcap composition, internal structure (e.g., coreless or core-clad), cross-sectional shape and size, length, longitudinal profile (e.g., straight, tapered, or widening), modal operation (i.e., single or multimode), refractive index profile, operating wavelength range, polarization-maintaining (PM) properties, and other endcap properties and characteristics may be varied in accordance with a specified application and may or may not be the same as those of the optical fiber 102.

It is appreciated that various endcap materials having no or low amounts of fluoride may be used in the present techniques. In one embodiment, the endcap material is made of an oxide-based glass material, such as silica ($SiO_2$), an aluminosilicate-based glass, a phosphosilicate-based glass, an aluminophosphosilicate-based glass, a germanium-oxide-based glass, a lead-germanate-based glass, a tellurium-oxide-based glass, and any combination thereof. In another embodiment, the endcap material is made of another type of non-fluoride-based glass material, such as a barium gallium germanate (BGG) glass, a tellurite-based material, a chalcogenide-based glass material, and any combination thereof. In another embodiment, the endcap material may be a non-glass-based material. Non-limiting examples include, to name a few, oxide-based crystal materials, such as sapphire ($Al_2O_3$), yttrium aluminum garnet (YAG; $Y_3Al_5O_{12}$), and other types of garnet crystal materials; and other types of crystal materials, such as zinc selenide (ZnSe) and diamond. It is appreciated that these endcap compositions may be used for the endcap 110 in FIG. 2 as well.

EXAMPLES & EXPERIMENTATION

Various aspects of the present techniques were tested in a study, as reported in the following article, the entire contents of which are incorporated herein by reference: Y. O. Aydin, F. Maes, V. Fortin, S. T. Bah, R. Vallée, and M. Bernier, "Endcapping of high-power 3 µm fiber lasers," Opt. Express 27(15), 20659-20669 (2019). It will be appreciated from the overall description of this study that the fiber laser systems and materials as well as the associated methods described herein may have a number of optional features, variations, and applications. In particular, the following description of experimentation and results is provided to further illustrate some aspects of the disclosed principles, but should not be construed as in any way limiting their scope.

The present study investigated the efficiency of different endcap materials to mitigate fiber tip degradation of high-power 3-µm-class fluoride-based fiber lasers. For this purpose, endcaps made of fluoride-based glass fibers (zirconium and aluminum fluorides), oxide-based glass fibers (lead-germanate and silica), and single-crystal sapphire fibers were spliced at the output of a high-power fiber laser operating near 3 µm and monitored for degradation over a period of 100 hours. The fluoride-based endcaps were found to undergo catastrophic failure after less than 10 hours. The oxide and crystal-based endcaps were found able to withstand the 100-hour test, but underwent a nonnegligible increase in temperature over time, suggesting that they may be suitable to extend the lifetime of high-power fiber laser systems (e.g., 20-watt power level or more). The present study also proposed another technique for suppressing OH diffusion within endcap material. The technique involved sputtering deposition of a thin film of silicon nitride ($Si_3N_4$) on the output face of the endcap to act as an OH diffusion barrier. The technique was tested on $ZrF_4$, $AlF_3$, and $Al_2O_3$ endcaps. The tested endcaps showed no sign of degradation under high-power 3-µm radiation over more than 100 hours of experimentation.

Experimental Setup

A home-made high-power 3-µm-class fiber laser system was used to investigate the degradation of the different endcap materials. The laser system is depicted schematically in FIG. 10 and is similar to the system reported in [4]. Briefly, the laser system included a 6.5-m-long, double-clad, 7-mol %-erbium-doped fluorozirconate ($Er^{3+}$:$ZrF_4$) fiber manufactured by Le Verre Fluoré. The 15-µm-diameter core of the fiber had a numerical aperture of 0.12, enabling single-mode operation above 2.4 µm. The fiber laser cavity was bounded by two intracore fiber Bragg gratings (FBGs), which were written through the polymer jacket of the fiber using femtosecond pulses in accordance with a scanning phase-mask technique [10, 11]. The entrance, high-reflectivity (HR) FBG had a reflectivity higher than 99% at 2.83 µm, while the exit, low-reflectivity (LR) FBG had a reflectivity of 8% at 2.83 µm. The active fiber and the HR and LR-FBGs were spooled on a grooved and fan-cooled aluminum spool having a 32-cm diameter, and secured with UV-cured polymer.

The laser system was optically pumped from the forward end only, using a 135-W commercial InGaAs 980-nm multimode laser diode. The laser diode had a silica delivery fiber that was fusion-spliced (S1) to the $Er^{3+}$:$ZrF_4$ fiber. At the output of the fiber laser cavity, a residual cladding pump stripper (RCPS) was fabricated by applying high-index UV-cured polymer on the bare $Er^{3+}$:$ZrF_4$ fiber. This pumping scheme enabled an efficiency of 23% with respect to the launched pump and a pump-power-limited maximum output power of around 29 W at 2.83 µm. A single-mode fusion-splice (S2) was provided between the output $Er^{3+}$:$ZrF_4$ fiber and a mode-matched passive $Er^{3+}$:$ZrF_4$ relay fiber to carry out multiple endcap degradation experiments. The relay fiber had a 15-µm core diameter, a numerical aperture of 0.12, and a 250-µm cladding diameter. The high-power all-fiber laser cavity was operated at an output power of around 20 W for all degradation experiments.

The degradation over time of the various endcaps was monitored by measuring the temperature of their output faces with a thermal camera (Jenoptik, VarioCAM®) equipped with a close-up lens. Simultaneously, the output power of the laser system was recorded with a thermopile detector (Gentec-EO, UP25N-250E-H12-D0) to ensure the laser system operated at a 20-W output power level throughout the experiments. It is noted that the laser cavity was operated at this output power level with the same nominal performances for over 800 hours in the course of the present study, with RMS fluctuations smaller than 0.1%.

Endcap Splicing and Manufacturing

The present study monitored the degradation of six different endcap materials: fluorozirconate glass ($ZrF_4$—$BaF_2$—$LaF_3$—$AlF_3$—NaF—$SrF_2$—$HfF_4$), fluoroaluminate glass ($AlF_3$—$AlCl_3$—NaF—$ZrF_4$—$YF_3$—$SrF_2$—$BaF_2$—$LaF_2$), lead-germanate glass ($GeO_2$—ZnO—PbO—$K_2O$—$PbF_2$), silica glass ($SiO_2$), and single-crystal sapphire ($Al_2O_3$). All endcap materials were provided in fiber (or single-crystal fiber) form and their specifications are presented in Table 1 below. The silica fiber was home-drawn using a Heraeus preform composed of a F-300 pure silica core and a F-320 fluorine-doped silica cladding [15]. Manufacturing an endcap out of a 50%-doped $Er^{3+}$:YAG single crystal ($Y_3Al_5O_{12}$) fiber was also studied given the unavailability of an undoped YAG fiber. It is noted that the studied endcap materials will be referred to hereinbelow by their main constituent, that is, $ZrF_4$ for fluorozirconate, $AlF_3$ for fluoroaluminate, and so on.

TABLE 1

Endcap Specifications[a].

| Endcap | Manufacturer | n[b] | α[c] [×10⁻⁶K⁻¹] | $T_g$[d] [° C.] | $Ø_c$[f] [µm] | L[g] [µm] |
|---|---|---|---|---|---|---|
| $ZrF_4$ | Le Verre Fluoré | 1.49 | 17.2 | 265 | 200 | 480 |
| $AlF_3$ | Fiberlabs | 1.46 | 18.6 | 390 | 200 | 450 |
| $GeO_2$ | Infrared Fiber Systems | 1.83 | 10.9 | 420 | 230 | 380 |
| $GeO_2$ | Le Verre Fluoré | 1.83 | 10.9 | 420 | 230 | 410 |
| $SiO_2$ | Heraeus F-300 | 1.42 | 0.55 | 1175 | 242 | 190 |

TABLE 1-continued

Endcap Specifications[a].

| Endcap | Manufacturer | n[b] | $\alpha$[c] [×10$^{-6}$K$^{-1}$] | $T_g$[d] [°C] | $\emptyset_c$[f] [μm] | L[g] [μm] |
|---|---|---|---|---|---|---|
| Er$^{3+}$:YAG | Shasta Crystals | 1.79 | 6.14 | $T_f$= 1940[e] | 220 | 320 |
| Al$_2$O$_3$ | Shasta Crystals | 1.72 | 5-5.6 | $T_f$= 2030[e] | 240 | N.A. |

[a]Optomechanical properties taken from [12-15].
[b]Refractive index around 3 μm.
[c]Thermal expansion coefficient.
[d]Transition temperature.
[e]Melting temperature.
[f]Core diameter.
[g]Length.

The endcaps were fusion-spliced to the passive ZrF$_4$ relay fiber using a Vytran® GPX system equipped with an iridium filament (Vytran®, FRAV4). For the ZrF$_4$ endcap, the filament was positioned at the splice point between the relay fiber and the ZrF$_4$ endcap. All other endcaps were spliced to the ZrF$_4$ relay fiber by offsetting the longitudinal position of the filament toward the endcap material, as detailed in [16]. Once the fusion splice was achieved, the endcap material was cleaved at a given length with a Vytran® LDC cleaver. Images of the final endcaps resulting from this manufacturing process are presented in FIGS. 12(a) to 12(c). Typical output power losses at 2.83 μm after splicing were about 4% for the fluoride endcaps (i.e., the ZrF$_4$ and AlF$_3$ endcaps) and about 8% for the GeO$_2$ endcaps, including fiber transmission losses and Fresnel reflections at the output endface of the endcap and at the splice interface. Prior to conducting the degradation tests, the assembly was secured using a low-index UV-cured polymer in a copper V-groove to ensure good heat conduction from the output endface to a heat sink. Care was taken to limit the length of the endcap protruding out of the copper V-groove. Thermal conduction was chosen in the present study to limit the maximum endface temperature and the rate of the OH diffusion process.

In contrast to the fluoride and the GeO$_2$ endcaps, the SiO$_2$, Er$^{3+}$:YAG, and Al$_2$O$_3$ endcaps formed no permanent thermal bonds when spliced to the ZrF$_4$ relay glass fiber. To overcome this limitation, the larger thermal expansion coefficient of ZrF$_4$ relative to the tested oxide-based endcap materials (see Table 1) was relied upon. By pushing in a controlled manner, the oxide-based endcap into the ZrF$_4$ relay fiber, after the endcap had been heated sufficiently, a permanent and robust joint was obtained, as seen in FIGS. 12(d) to 12(f). The strength of the joint was provided mainly by the ZrF$_4$ glass, which wrapped tightly around the oxide-based endcap after cooling down of the splice point. It is noted that all fusion-splices resulting from this splicing procedure were proof-tested at a tension of 200 g (roughly 4.4 MPa) prior to being used in the tests. The typical output power losses at 2.83 μm after splicing the SiO$_2$, Er$^{3+}$:YAG and Al$_2$O$_3$ endcaps were 8%, 10%, and 16%, respectively.

Figure 13B:
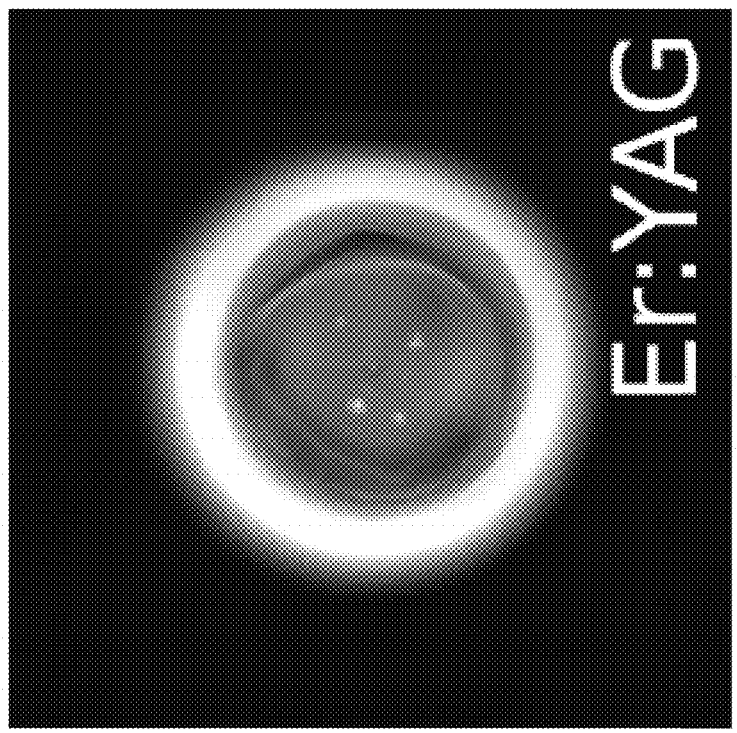
FIGS. 13(a) and 13(b) are photographs of the interface between a $ZrF_4$ relay fiber and an $SiO_2$ endcap and the interface between a $ZrF_4$ relay fiber and an $Er^{3+}$:YAG endcap, respectively.
Figure 13A:
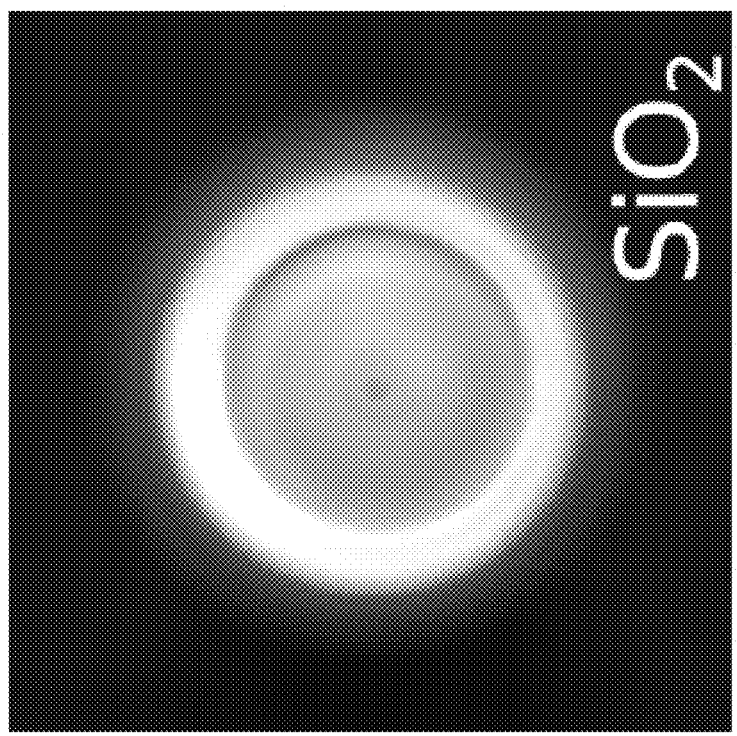

In the case of the SiO$_2$ and the Er$^{3+}$:YAG endcaps, it was possible to cleave the endcap material after the splicing process, as seen in FIGS. 12(d) and 12(e), and cool the assembly in the same manner as the fluoride and the GeO$_2$ endcaps. It is noted that the length of the SiO$_2$ endcap was shortened as much as possible due to its high absorption losses of about 25 dB/m near 2.83 μm. For the Er$^{3+}$:YAG endcap, cleaving was simplified by the fact that the crystalline planes of the Er$^{3+}$:YAG fiber are perpendicular to its optical axis, as shown in [17]. Photographs of the splice interfaces between the ZrF$_4$ relay fiber and the SiO$_2$ and the Er$^{3+}$:YAG endcaps are shown in FIGS. 13(a) and 13(b), respectively. From FIG. 13(a), it is appreciated that the interface between the SiO$_2$ endcap and the ZrF$_4$ relay fiber was smooth and that it did not deteriorate the quality of the laser beam. As for the Er$^{3+}$:YAG endcap, one can see from FIG. 13(b) some bubbles at the interface, which could degrade the beam quality if provided in the beam path. However, it is believed that the splicing recipe could be modified to prevent the formation of such bubbles and enable cleaner splice interfaces, similar to the one depicted in FIG. 13(a) for the SiO$_2$ endcap. For the single-crystal sapphire fiber, it was not possible to cleave or polish the endcap without breaking the splice point, due to the crystalline planes being oriented at 45° with respect to the fiber axis and to the high mechanical strength of the endcap material. Therefore, the entire length of the sapphire fiber (i.e., about 50 cm) was kept for the degradation test. Furthermore, given that the sapphire fiber was coreless, attempts at cooling the fiber extremity using the copper assembly described above resulted in leakage of the 3-μm signal from the side and the eventual failure of the assembly. Therefore, the sapphire fiber tip was tested under natural heat convection, instead of heat conduction as for the other endcaps.

Results and Discussion

Figure 14:
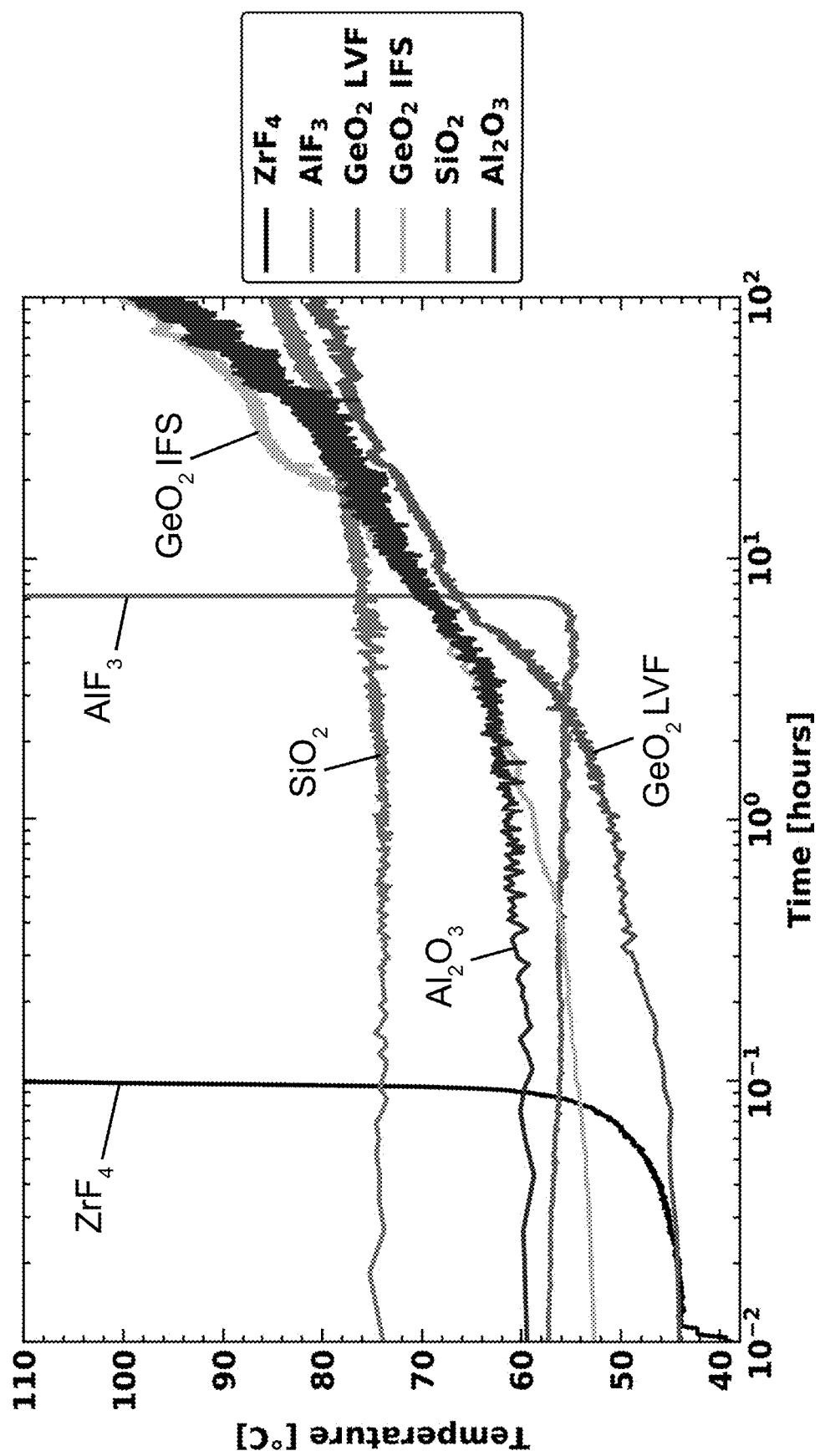
FIG. 14 depicts time-dependent fiber endcap temperature measurements at a constant 3-µm output power of 20 W. Each curve in FIG. 14 depicts the measured temperature of a respective endcap as a function of time over a period of 100 hours.

Endcap degradation. FIG. 14 illustrates the degradation of the endcaps under the action of 20-W CW output power at 2.83 μm over a 100-hour time period. The initial temperature of the different endcaps was found to vary between about 40° C. and 75° C., a variation accounted for by differences in endcap parameters, such as the initial OH-compound concentration, the absorption coefficient at 2.83 μm, the thermal conductivity, and the refractive index (the refractive index determining the intensity of Fresnel reflections at the endcap interface). As reported in [4], the fluoride-based endcaps did not withstand the experiment more than 10 hours. While the initial temperature of the multimode ZrF$_4$ endcap was the lowest of all the endcaps that were tested (40° C.), it underwent catastrophic failure after only 10 minutes. The degradation curve of the ZrF$_4$ endcap, as well as the time elapsed before failure, agree with the results reported in [9]. The AlF$_3$ endcap survived for about 10 hours under similar conditions, reflecting the fact that its glass matrix is more than one order of magnitude more stable in water than that of ZrF$_4$ [18]. Thus, the present study found that AlF$_3$-based endcaps—and even more so ZrF4-based endcaps—generally provide unsuitable, long-term solutions when operating around 3 μm with output powers greater than a few watts. Based on previous reports having used AlF$_3$ endcaps to protect fiber laser systems from photodegradation [19, 20], it may be concluded that the use of AlF$_3$ endcaps to achieve long-term operation is appropriate for 3-μm fiber laser systems operating with output powers of at most a few watts.

From FIG. 14, it can be seen that the oxide-based and crystalline endcaps that were tested all survived the 100-hour-long degradation experiment. However, the experiment also revealed that their temperature increased over time, thus indicating the existence of some degradation at the output power of 20 W. Table 2 below summarizes the degradation performance of the SiO$_2$ and the GeO$_2$-based endcaps. The initial temperature of the SiO$_2$ endcap (74° C.) was noticeably higher than that of the two GeO$_2$ endcaps (44° C. and 53° C.), a direct result of the strong absorption of SiO$_2$ around 3 μm. Given the constant ambient temperature during the experiment of 20° C., the initial temperature rise of the $SiO_2$ endcap per watt of output power at 3 μm was found to be 2.70° C./W, while those of the two $GeO_2$ endcaps were about twice less, that is, 1.20° C./W and 1.40° C./W. Hence, in the perspective of power-scaling the output power of 3-μm-class all-fiber lasers to 100 W, one can expect an $SiO_2$ endcap to reach an initial temperature of about 290° C. and a $GeO_2$ endcap to reach an initial temperature ranging between about 140° C. and 218° C. Thus, $GeO_2$ endcaps were found generally to be better candidates for high-power 3-μm systems since the splice between the $SiO_2$ endcaps and the $ZrF_4$ fiber generally cannot withstand temperatures in excess of the transition temperature of $ZrF_4$ (i.e., about 270° C., see [12]). Nonetheless, for high-power systems (e.g., operating at about 20 W), $SiO_2$ endcaps may provide a more suitable alternative than $GeO_2$ endcaps, given that the degradation rate of the former is more than three times slower than that of the latter. This smaller degradation rate enabled the $SiO_2$ endcap to reach, after 100 hours, a final temperature similar to that of the $GeO_2$ endcap from Le Verre Fluoré, although the initial temperature of the former was 33° C. higher than that of the latter. Furthermore, $SiO_2$ endcaps are generally less expensive and easier to handle and process than $GeO_2$ endcaps. Additionally, the refractive index of $SiO_2$ around 3 μm (1.42) is closer to the refractive index of $ZrF_4$ glass (1.49) than is the refractive index of $GeO_2$ (1.83). This characteristic may also favor $SiO_2$ endcaps in the design of powerful mid-infrared mode-locked or in-amplifier supercontinuum fiber lasers [21, 22], as mentioned above.

TABLE 2

$SiO_2$ and $GeO_2$ endcap performances.

| Endcap | Manufacturer | $T_i$[a] [° C.] | $\Delta T_i/\Delta P$[b] [° C./W] | $T_{i,100W}$[c] [° C.] | $\Delta T/\Delta t$[d] [° C./h] |
|---|---|---|---|---|---|
| $GeO_2$ | Le Verre Fluoré | 44 | 1.20 | 140 | 0.37 |
| $GeO_2$ | Infrared Fiber Systems | 53 | 1.65 | 218 | 0.47 |
| $SiO_2$ | Heraeus F-300 | 74 | 2.70 | 290 | 0.10 |

[a]Initial temperature.
[b]$T_i$ variation with 3-μm output power.
[c]Extrapolated $T_i$ at 100 W output power.
[d]Temperature variation over time.

As for the $SiO_2$ and $GeO_2$ endcaps, the $Al_2O_3$ fiber tip exhibited signs of degradation over time under the influence of the high-power 3-μm laser light. The initial temperature of the $Al_2O_3$ fiber tip was 60° C. and its final temperature was 97° C., corresponding to a degradation rate of 0.37° C./h. It is noted that the initial temperature and degradation rate of the $Al_2O_3$ fiber tip were comparable to those of the $GeO_2$ endcaps. However, the $Al_2O_3$ fiber tip experienced natural convection, rather than heat conduction as for the other endcaps, which may accelerate degradation by an order of magnitude [9]. Therefore, it is envisioned that the use of $Al_2O_3$ endcaps, rather than fiber tips, may provide a solution to the issue of photodegradation caused by moisture diffusion in high-power 3-μm fiber laser systems, contingent upon the ability of manufacturing endcaps from single-crystal $Al_2O_3$ fibers. One alternative to manufacturing $Al_2O_3$ endcaps would be to inscribe depressed-cladding single-mode waveguides with femtosecond pulses in the $Al_2O_3$ rod fiber, as reported recently in [23]. Such an approach could preserve the beam quality of the 3-μm fiber laser system despite the long lengths of $Al_2O_3$ fiber used for beam delivery purposes.

The $Er^{3+}$:YAG endcap could not be tested since its temperature was already around 120° C. at 3 μm and a power level of 2.4 W. Nonetheless, it is envisioned that undoped single-crystal YAG fibers could provide efficient endcap materials because they possess thermal and mechanical properties similar to those of $Al_2O_3$ fibers and may be readily processed into endcaps at the tip of $ZrF_4$ fibers.

$Si_3N_4$ coating for high-power 3-μm fiber lasers. In order to further inhibit OH diffusion within endcap materials, the output face of a number of endcaps were coated with a nanoscopic thin film of silicon nitride ($Si_3N_4$). Silicon nitride is commonly used in electronics as a diffusion barrier for $SiO_2$ dielectric layers or as passivation layers in flexible electroluminescent devices.

In the present study, the $Si_3N_4$ thin films were deposited on the output face of the endcaps using reactive ion beam-assisted double magnetron sputtering, such as described in [24], under a $1.46 \times 10^{-3}$ torr environment. The target material was a six-inch-diameter, 99.99 percent pure silicon disk. The temperature of the substrate was kept at 115° C. Deposition of the thin film was done at a 0.24 nm/s deposition rate. An argon gas flow was maintained at 32 SCCM during the sputtering process, and a reactive gas (nitrogen; 22 SCCM) was introduced inside the chamber by the ion source. The uniformity of the deposited thin film was enhanced by rotating the substrate holder at 80 rpm.

Figures 15A, 15B, 15C:
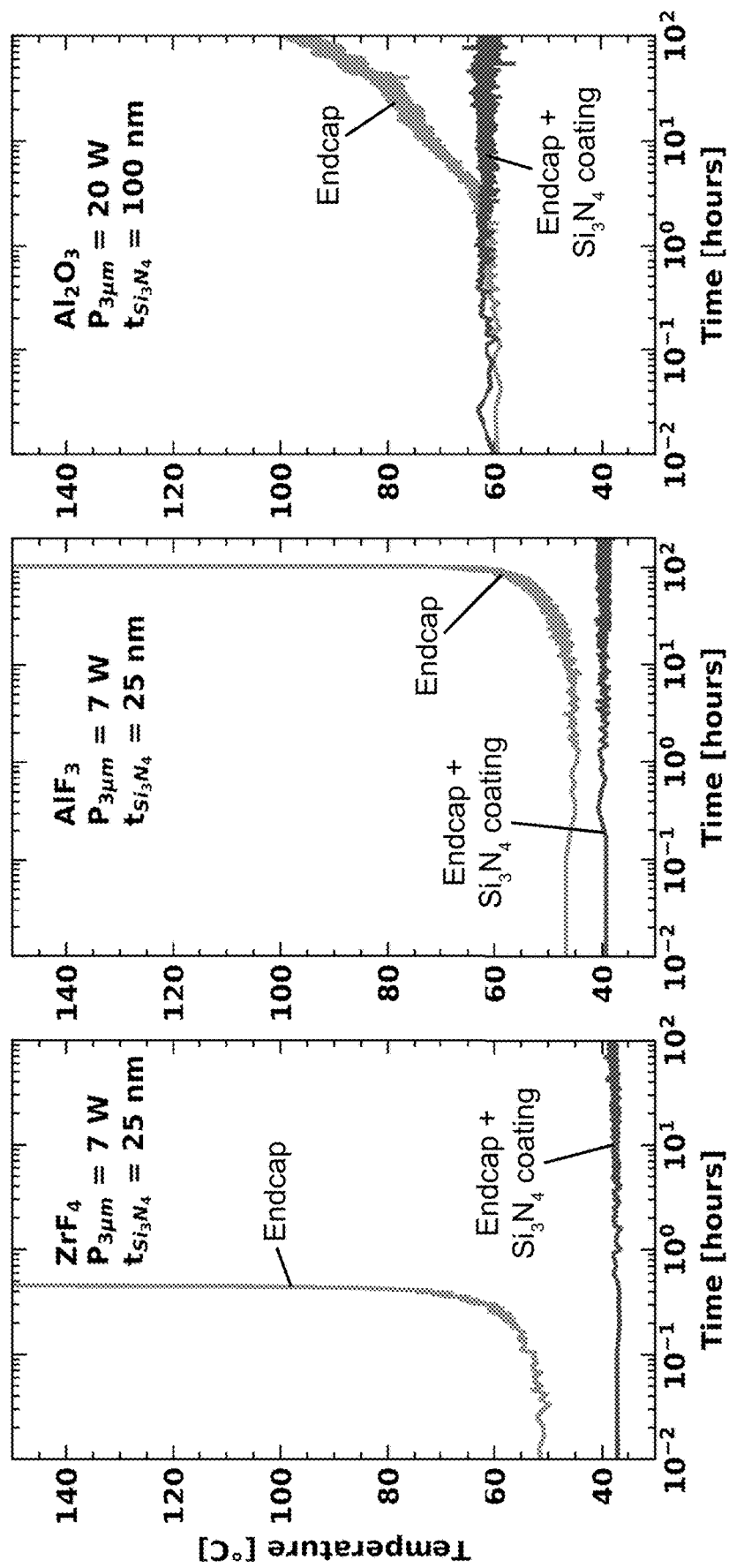
FIGS. 15(a) to 15(c) depict time-dependent fiber endcap temperature measurements performed on $Si_3N_4$-coated and uncoated fiber endcaps over a period of 100 hours.

FIGS. 15(a) to 15(c) compares the degradation of $Si_3N_4$-coated and uncoated $ZrF_4$ [FIG. 15(a)], $AlF_3$ [FIG. 15(b)], and $Al_2O_3$ [FIG. 15(c)] endcaps under the impact of 3-μm light over a 100-hour time period. The thickness of the $Si_3N_4$ coating was a 25 nm for the $ZrF_4$ and $AlF_3$ endcaps and 100 nm for the $Al_2O_3$ endcaps. For both $ZrF_4$ and $AlF_3$, the coating thickness was limited to less than one percent of the wavelength to limit Fresnel reflections because of the high refractive index (n~1.95) of $Si_3N_4$. The output power of the 3-μm fiber laser was 7 W for the $ZrF_4$ and $AlF_3$ endcaps and 20 W for the $Al_2O_3$ endcaps. All experienced natural convection to accelerate the photodegradation process. From FIGS. 15(a) to 15(c), it is seen that the provision of the $Si_3N_4$ coating inhibited OH diffusion for all the tested endcaps, as no increase in temperature over time was recorded. FIGS. 15(a) to 15(c) also illustrate that $Si_3N_4$ coatings may be applied on a variety of fiber-optic materials.

Conclusion

In the present study, the OH degradation of various fiber endcaps spliced at the output of a 20-W all-fiber laser operating at 3 μm was monitored over a 100-hour time period. The present study found that the fluoride-based endcaps (i.e., the $ZrF_4$— and $AlF_3$-based endcaps) lasted for less than 10 hours before undergoing catastrophic failure. The study also found that the oxide-based endcaps (i.e., the $GeO_2$— and $SiO_2$-based endcaps) and the $Al_2O_3$ fiber tip survived the experiment, thus making them attractive endcap solutions in some applications, for example, at output power levels between about 1 and 20 W. In order to further reduce OH diffusion with endcap materials under the irradiation of intense 3-μm light, the study also proposed to coat the output face of endcaps with a silicon nitride ($Si_3N_4$) thin film. The potential of the proposed approach in reducing OH diffusion was tested on a $ZrF_4$ endcap, an $AlF_3$ endcap, and an $Al_2O_3$ fiber tip, each of which coated with a $Si_3N_4$ thin film. Upon illumination with 3-μm light over a 100-hour time period, the coated endcaps and fiber tip showed no sign of degradation, whereas their uncoated counterparts either underwent catastrophic failure (ZrF$_4$ and AlF$_3$) or showed a nonnegligible temperature rise (Al$_2$O$_3$).

Numerous modifications could be made to the embodiments described above without departing from the scope of the appended claims.

REFERENCES

The following is a list of references, the entire contents of which are incorporated herein by reference.
1. W. Shi, Q. Fang, X. Zhu, R. A. Norwood, and N. Peyghambarian, "Fiber lasers and their applications," Appl. Opt. 53(28), 6554-6568 (2014).
2. A. Carter, B. N. Samson, K. Tankala, D. P. Machewirth, V. Khitrov, U. H. Manyam, F. Gonthier, and F., "Damage mechanisms in components for fiber lasers and amplifiers," Proc. SPIE 5647, 561-571 (2004).
3. E. A. Shcherbakov, V. V. Fomin, A. A. Abramov, A. A. Ferin, D. V. Mochalov, and V. P. Gapontsev, "Industrial grade 100 kW power CW fiber laser," in Advanced Solid-State Lasers Congress, OSA Technical Digest (online) (Optical Society of America, 2013), paper ATh4A.2.
4. Y. O. Aydin, V. Fortin, M. Bernier, and R. Vallée, "Towards power scaling of 2.8 µm fiber lasers," Opt. Lett. 43(18), 4542-4545 (2018).
5. V. Fortin, F. Jobin, M. Larose, M. Bernier, and R. Vallée, "10 W-level monolithic dysprosium-doped fiber laser at 3.24 µm," Opt. Lett. 44(3), 491-494 (2019)
6. F. Maes, V. Fortin, M. Bernier, and R. Vallée, "5.6 W monolithic fiber laser at 3.55 µm," Opt. Lett. 42(11), 2054-2057 (2017).
7. F. Maes, V. Fortin, S. Poulain, M. Poulain, J.-Y. Carrée, M. Bernier, and R. Vallée, "Room-temperature fiber laser at 3.92 µm," Optica 5(7), 761-764 (2018).
8. S. D. Jackson, "Towards high-power mid-infrared emission from a fibre laser," Nat. Photonics 6(7), 423-431 (2012).
9. N. Caron, M. Bernier, D. Faucher, and R. Vallée, "Understanding the fiber tip thermal runaway present in 3 µm fluoride glass fiber lasers," Opt. Express 20(20), 22188-22194 (2012).
10. M. Bernier, D. Faucher, R. Vallée, A. Saliminia, G. Androz, Y. Sheng, and S. L. Chin, "Bragg gratings photoinduced in ZBLAN fibers by femtosecond pulses at 800 nm," Opt. Lett. 32(5), 454-456 (2007).
11. J. Habel, T. Boilard, J.-S. Frenière, F. Trépanier, and M. Bernier, "Femtosecond FBG written through the coating for sensing applications," Sensors 17(11), 519 (2017).
12. X. Zhu and N. Peyghambarian, "High-power ZBLAN glass fiber lasers: Review and prospect," Adv. Optoelectron. 2010, 1-23 (2010).
13. H. Li, J. Lousteau, W. N. Macpherson, X. Jiang, H. T. Bookey, J. S. Barton, A. Jha, and A. K. Kar, "Thermal sensitivity of tellurite and germanate optical fibers," Opt. Express 15(14), 8857-8863 (2007).
14. Shasta Crystals, "Product catalog," (2018).
15. Heraeus, "Specialty fiber preforms for the most demanding applications," https://www.heraeus.com/media/media/hqs/doc_hqs/products_and_solutions_8/optical_fiber/Specialty_Fiber_Preforms_EN.pdf.
16. S. Jiang and J. Wang, "Method of fusion splicing silica fiber with low-temperature multi-component glass fiber," U.S. Pat. No. 6,705,771 (Apr. 16, 2004).
17. R. Thapa, D. Gibson, R. R. Gattass, C. Askins, W. Kim, S. Bayya, L. B. Shaw, and J. S. Sanghera, "Fusion splicing of highly dissimilar YAG crystal fiber and silica fiber with reaction bonding," Opt. Mater. Express 6(8), 2560-2566 (2016).
18. G. H. Frischat, B. Hueber, and B. Ramdohr, "Chemical stability of ZrF$_4$ and AlF$_3$-based heavy metal fluoride glasses in water," J. Non-Cryst. Solids 284(1-3), 105-109 (2001).
19. Y. O. Aydin, V. Fortin, D. Kraemer, A. Fraser, R. Vallée, and M. Bernier, "High-energy picosecond pulses from a 2850 nm fiber amplifier," Opt. Lett. 43(12), 2748-2751 (2018).
20. S. Duval, J.-C. Gauthier, L.-R. Robichaud, P. Paradis, M. Olivier, V. Fortin, M. Bernier, M. Piché, and R. Vallée, "Watt-level fiber-based femtosecond laser source tunable from 2.8 to 3.6 µm," Opt. Lett. 41(22), 5294-5297 (2016).
21. J. C. Gauthier, V. Fortin, S. Duval, R. Vallée, and M. Bernier, "In-amplifier mid-infrared supercontinuum generation," Opt. Lett. 40(22), 5247-5250 (2015).
22. S. Duval, M. Bernier, V. Fortin, J. Genest, M. Piché, and R. Vallée, "Femtosecond fiber lasers reach the mid-infrared," Optica 2(7), 623-626 (2015).
23. J.-P. Bérubé, J. Lapointe, A. Dupont, M. Bernier, and R. Vallée, "Femtosecond laser inscription of depressed cladding single-mode mid-infrared waveguides in sapphire," Opt. Lett. 44(1), 37-40 (2019).
24. S. T. Bah, C. O. Ba, M. D'Auteuil, P. Ashrit, L. Sorelli, and R. Vallée, "Fabrication of TaO$_x$N$_y$ thin films by reactive ion beam-assisted ac double magnetron sputtering for optical applications," Thin Films 615,351-357 (2016).

The invention claimed is:
1. An optical fiber product, comprising:
an optical fiber made of a fiber-optic material and configured for propagation of mid-infrared radiation toward a light-radiating endface of or coupled to the optical fiber; and
a diffusion barrier disposed on the light-radiating endface and configured for allowing the mid-infrared radiation emanating from the light-radiating endface to pass therethrough and for preventing OH diffusion therethrough toward the light-radiating endface, wherein the diffusion barrier comprises a thin-film coating.
2. The optical fiber product of claim 1, wherein the fiber-optic material comprises a glass material.
3. The optical fiber product of claim 2, wherein the glass material comprises a fluoride-based glass, a chalcogenide-based glass, a chalcohalide-based glass, an oxide-based glass, a tellurite-based glass, or any combination thereof.
4. The optical fiber product of claim 1, wherein the fiber-optic material comprises a crystal material.
5. The optical fiber product of claim 1, wherein the light-radiating endface is an endface of the optical fiber.
6. The optical fiber product of claim 1, wherein the light-radiating endface is an endface of an endcap coupled between the optical fiber and the diffusion barrier.
7. The optical fiber product of claim 6, wherein the endcap is made of an endcap material that is less permeable to OH diffusion than the fiber-optic material.
8. The optical fiber product of claim 1, wherein the light-radiating endface is perpendicular to a longitudinal fiber axis of the optical fiber product.
9. The optical fiber product of claim 1, wherein the light-radiating endface is oblique to a longitudinal fiber axis of the optical fiber product.
10. The optical fiber product of claim 1, wherein the thin-film coating comprises a single thin-film layer.

11. The optical fiber product of claim 1, wherein the thin-film coating comprises multiple thin-film layers.

12. The optical fiber product of claim 1, wherein the diffusion barrier extends over all of the light-radiating endface.

13. An optical fiber product, comprising:
an optical fiber made of a fiber-optic material and configured for propagation of mid-infrared radiation toward a light-radiating endface of or coupled to the optical fiber; and
a diffusion barrier disposed on the light-radiating endface and configured for allowing the mid-infrared radiation emanating from the light-radiating endface to pass therethrough and for preventing OH diffusion therethrough toward the light-radiating endface, wherein the diffusion barrier has a thickness ranging from about 1 nm to about 10 µm.

14. The optical fiber product of claim 13, wherein the thickness of the diffusion barrier ranges from about 10 nm and about 100 nm.

15. The optical fiber product of claim 1, wherein the diffusion barrier is made of a barrier material comprising a dielectric, a carbon-based material, a metal, a metalloid, a metal oxide, an alloy, a composite material, or any combination thereof.

16. The optical fiber product of claim 1, wherein the diffusion barrier is made of a barrier material comprising a ceramic compound.

17. The optical fiber product of claim 16, wherein the ceramic compound comprises a carbide, a nitride, a boride, an oxide, or any combination thereof.

18. An optical fiber product, comprising:
an optical fiber made of a fiber-optic material and configured for propagation of mid-infrared radiation toward a light-radiating endface of or coupled to the optical fiber; and
a diffusion barrier disposed on the light-radiating endface and configured for allowing the mid-infrared radiation emanating from the light-radiating endface to pass therethrough and for preventing OH diffusion therethrough toward the light-radiating endface,
wherein the diffusion barrier is made of a barrier material comprising a ceramic compound, wherein the ceramic compound comprises silicon nitride, silicon oxynitride, silicon carbide, boron nitride, silicon carbide, boron carbide, tungsten carbide, or any combination thereof.

19. A fiber-based laser oscillator, laser amplifier, or laser beam delivery system comprising the optical fiber product of claim 1.

20. The optical fiber product of claim 1, wherein the diffusion barrier has a thickness ranging from about 1 nm to about 10 µm.

21. The optical fiber product of claim 20, wherein the thickness of the diffusion barrier ranges from about 10 nm to about 100 nm.

22. The optical fiber product of claim 16, wherein the ceramic compound comprises silicon nitride, silicon oxynitride, silicon carbide, boron nitride, silicon carbide, boron carbide, tungsten carbide, or any combination thereof.

23. The optical fiber product of claim 13, wherein the fiber-optic material comprises a glass material.

24. The optical fiber product of claim 23, wherein the glass material comprises a fluoride-based glass, a chalcogenide-based glass, a chalcohalide-based glass, an oxide-based glass, a tellurite-based glass, or any combination thereof.

25. The optical fiber product of claim 13, wherein the fiber-optic material comprises a crystal material.

26. The optical fiber product of claim 13, wherein the light-radiating endface is an endface of the optical fiber.

27. The optical fiber product of claim 13, wherein the light-radiating endface is an endface of an endcap coupled between the optical fiber and the diffusion barrier.

28. The optical fiber product of claim 27, wherein the endcap is made of an endcap material that is less permeable to OH diffusion than the fiber-optic material.

29. The optical fiber product of claim 13, wherein the light-radiating endface is perpendicular to a longitudinal fiber axis of the optical fiber product.

30. The optical fiber product of claim 13, wherein the light-radiating endface is oblique to a longitudinal fiber axis of the optical fiber product.

31. The optical fiber product of claim 13, wherein the diffusion barrier comprises a thin-film coating comprising a single thin-film layer.

32. The optical fiber product of claim 13, wherein the diffusion barrier comprises a thin-film coating comprising multiple thin-film layers.

33. The optical fiber product of claim 13, wherein the diffusion barrier extends over all of the light-radiating endface.

34. The optical fiber product of claim 13, wherein the diffusion barrier is made of a barrier material comprising a dielectric, a carbon-based material, a metal, a metalloid, a metal oxide, an alloy, a composite material, or any combination thereof.

35. The optical fiber product of claim 13, wherein the diffusion barrier is made of a barrier material comprising a ceramic compound.

36. The optical fiber product of claim 35, wherein the ceramic compound comprises a carbide, a nitride, a boride, an oxide, or any combination thereof.

37. The optical fiber product of claim 35, wherein the ceramic compound comprises silicon nitride, silicon oxynitride, silicon carbide, boron nitride, silicon carbide, boron carbide, tungsten carbide, or any combination thereof.

38. A fiber-based laser oscillator, laser amplifier, or laser beam delivery system comprising the optical fiber product of claim 14.

39. The optical fiber product of claim 18, wherein the fiber-optic material comprises a glass material.

40. The optical fiber product of claim 39, wherein the glass material comprises a fluoride-based glass, a chalcogenide-based glass, a chalcohalide-based glass, an oxide-based glass, a tellurite-based glass, or any combination thereof.

41. The optical fiber product of claim 18, wherein the fiber-optic material comprises a crystal material.

42. The optical fiber product of claim 18, wherein the light-radiating endface is an endface of the optical fiber.

43. The optical fiber product of claim 18, wherein the light-radiating endface is an endface of an endcap coupled between the optical fiber and the diffusion barrier.

44. The optical fiber product of claim 43, wherein the endcap is made of an endcap material that is less permeable to OH diffusion than the fiber-optic material.

45. The optical fiber product of claim 18, wherein the light-radiating endface is perpendicular to a longitudinal fiber axis of the optical fiber product.

46. The optical fiber product of claim 18, wherein the light-radiating endface is oblique to a longitudinal fiber axis of the optical fiber product.

47. The optical fiber product of claim 18, wherein the diffusion barrier comprises a thin-film coating comprising a single thin-film layer.

48. The optical fiber product of claim 18, wherein the diffusion barrier comprises a thin-film coating comprising multiple thin-film layers.

49. The optical fiber product of claim 18, wherein the diffusion barrier extends over all of the light-radiating endface.

50. The optical fiber product of claim 18, wherein the diffusion barrier has a thickness ranging from about 10 nm and about 100 nm.

51. The optical fiber product of claim 18, wherein the diffusion barrier is made of a barrier material comprising a dielectric, a carbon-based material, a metal, a metalloid, a metal oxide, an alloy, a composite material, or any combination thereof.

52. The optical fiber product of claim 18, wherein the diffusion barrier is made of a barrier material comprising a ceramic compound.

53. The optical fiber product of claim 52, wherein the ceramic compound comprises a carbide, a nitride, a boride, an oxide, or any combination thereof.

54. A fiber-based laser oscillator, laser amplifier, or laser beam delivery system comprising the optical fiber product of claim 19.

* * * * *